US012128311B2

(12) United States Patent
Yuan

(10) Patent No.: US 12,128,311 B2
(45) Date of Patent: Oct. 29, 2024

(54) COLLISION DATA PROCESSING METHOD AND APPARATUS, COMPUTER DEVICE, AND STORAGE MEDIUM

(71) Applicant: Tencent Technology (Shenzhen) Company Limited, Guangdong (CN)

(72) Inventor: Jiaping Yuan, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 198 days.

(21) Appl. No.: 17/975,186

(22) Filed: Oct. 27, 2022

(65) Prior Publication Data

US 2023/0055516 A1 Feb. 23, 2023

Related U.S. Application Data

(63) Continuation of application No. PCT/CN2022/079809, filed on Mar. 9, 2022.

(30) Foreign Application Priority Data

Mar. 31, 2021 (CN) ........................ 202110352747.3

(51) Int. Cl.
*A63F 13/577* (2014.01)
*A63F 13/573* (2014.01)

(52) U.S. Cl.
CPC .......... *A63F 13/577* (2014.09); *A63F 13/573* (2014.09); *A63F 2300/643* (2013.01)

(58) Field of Classification Search
CPC ...... A63F 13/577; A63F 13/573; A63F 13/57; A63F 2300/643; A63F 2300/64
(Continued)

(56) References Cited

U.S. PATENT DOCUMENTS 9,495,485 B2 * 11/2016 Matsuike .............. A63F 13/577
10,235,764 B2 * 3/2019 Kuang .................... G06T 19/00
(Continued)

FOREIGN PATENT DOCUMENTS

CN 109785420 A 5/2019
CN 111192354 A 5/2020
(Continued)

OTHER PUBLICATIONS

International Search Report of PCT/CN2022/079809 dated Jun. 10, 2022 [PCT/ISA/210].

(Continued)

*Primary Examiner* — Allen Chan
(74) *Attorney, Agent, or Firm* — Sughrue Mion, PLLC

(57) ABSTRACT

A collision data processing method includes: determining, based on a physical engine detecting that a first rigid body having a first physical attribute collides with a second rigid body having a second physical attribute, an initial cutting model from a first model corresponding to the first rigid body and a second model corresponding to the second rigid body based on the first physical attribute and the second physical attribute, capturing, by the physical engine, a collision point between the first rigid body and the second rigid body, and determining normal vector information corresponding to the collision point based on collision data, and determining a first cutting surface in the initial cutting model based on the collision point, the normal vector information, and model information of the initial cutting model, and cutting the initial cutting model based on the first cutting surface to obtain cutting data.

20 Claims, 11 Drawing Sheets

(58) Field of Classification Search
USPC .......................................................... 463/31
See application file for complete search history.

(56) References Cited

U.S. PATENT DOCUMENTS

| | | | | |
|---|---|---|---|---|
| 10,885,242 | B2 * | 1/2021 | Simic | G06F 30/20 |
| 2007/0132766 | A1 | 6/2007 | Kim et al. | |
| 2017/0104661 | A1 | 4/2017 | Anastasi et al. | |
| 2017/0344680 | A1 | 11/2017 | Strunk et al. | |

FOREIGN PATENT DOCUMENTS

| | | | | |
|---|---|---|---|---|
| CN | 111862052 | A | 10/2020 | |
| CN | 112915542 | A | 6/2021 | |
| WO | WO-2005038560 | A2 * | 4/2005 | A63F 13/10 |

OTHER PUBLICATIONS

Written Opinion of PCT/CN2022/079809 dated Jun. 10, 2022 [PCT/ISA/237].

* cited by examiner

COLLISION DATA PROCESSING METHOD AND APPARATUS, COMPUTER DEVICE, AND STORAGE MEDIUM

CROSS-REFERENCE TO RELATED APPLICATIONS

This application is a continuation application of International Application No. PCT/CN2022/079809, filed on Mar. 9, 2022, which claims priority to Chinese Patent Application No. 202110352747.3, filed with the China National Intellectual Property Administration on Mar. 31, 2021, the disclosures of each of which being incorporated by reference herein in their entireties.

FIELD

The disclosure relates to the field of computer technology, and in particular, to a dynamic image rendering technology.

BACKGROUND

At present, design users need to construct collision simulation models based on multiple independent models in a computer device with a simulation environment. For example, for a virtual building (e.g. a wall) in a game, a design user usually needs to place a large number of independent models (e.g. bricks) at corresponding positions in sequence, so as to construct the wall. The entire building process takes more time, and will take more time in the case of a large size and irregular shape of a model-to-be-built, thus improving labor cost and reducing the efficiency of collision simulation.

When detecting whether model A (e.g. an iron ball) collides with model B (e.g. a wall), the computer device may use independent bricks constituting the wall and the iron ball as a group of collision detection objects. For example, if the wall is composed of 100 independent bricks, it means that there will be 100 groups of collision detection objects in this collision detection. In other words, the computer device needs to perform collision detection separately for each group of collision detection objects, and the number of collision detections performed is equal to the number of independent bricks in the wall, which increases the computation amount of a Central Processing Unit (CPU) and a Graphics Processing Unit (GPU) of the computer device, thereby easily causing a phenomenon of picture blocking and reducing the fluency of collision simulation.

SUMMARY

According to some embodiments, a collision data processing method, performed by a computer device, may include: determining, based on a physical engine detecting that a first rigid body having a first physical attribute collides with a second rigid body having a second physical attribute, an initial cutting model from a first model corresponding to the first rigid body and a second model corresponding to the second rigid body based on the first physical attribute and the second physical attribute; capturing, by the physical engine, a collision point between the first rigid body and the second rigid body, and determining normal vector information corresponding to the collision point based on collision data associated with the collision point; and determining a first cutting surface in the initial cutting model based on the collision point, the normal vector information, and model information of the initial cutting model, and cutting the initial cutting model based on the first cutting surface to obtain cutting data for presentation on a mobile terminal, the cutting data representing a collision effect between the first model and the second model.

According to various embodiments, a collision data processing apparatus, a computer device, a non-transitory computer-readable storage medium, and a computer program product or a computer program consistent with the method may also be provided.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
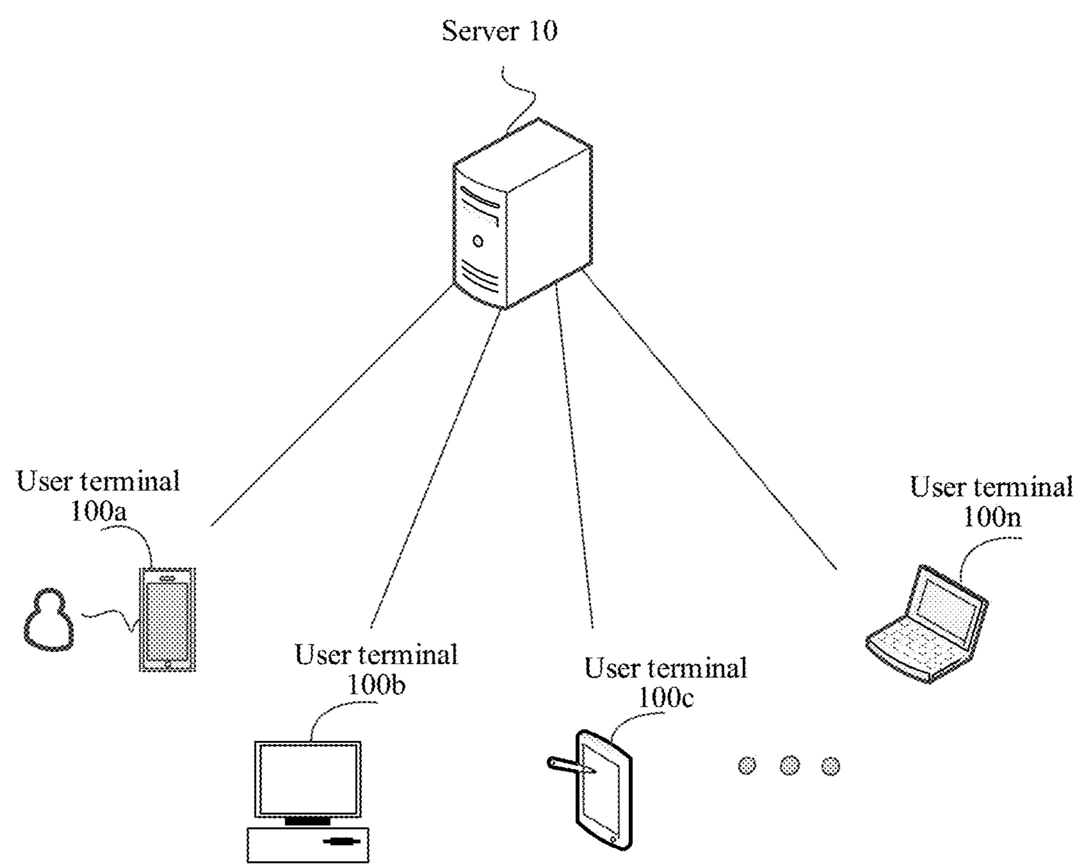
FIG. 1 is a schematic structural diagram of a network architecture according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all embodiments. However, it may be understood that the "some embodiments" may be the same subset or different subsets of all the embodiments, and may be combined with each other without conflict.

In some embodiments, a physical engine introduced by a computer device having a collision simulation function can acquire physical attributes of rigid bodies in real time. One rigid body corresponds to one original model. When the physical engine detects that a first rigid body having a first physical attribute collides with a second rigid body having a second physical attribute, the computer device may determine an initial cutting model from a first model corresponding to the first rigid body and a second model corresponding to the second rigid body based on the first physical attribute and the second physical attribute, capture a collision point at which the first rigid body collides with the second rigid body based on the physical engine, determine normal vector information corresponding to the collision point based on collision data associated with the collision point, determine a first cutting surface in the initial cutting model according to the collision point, the normal vector information corresponding to the collision point, and model information of the initial cutting model, and then cut the initial cutting model based on the first cutting surface to obtain cutting data for presentation on a mobile terminal. The cutting data may be used for simulating a simulation effect of breaking the initial cutting model into fragments. The first model and the second model in some embodiments are both independent original models, rather than models built by multiple independent models. Therefore, in the process of collision simulation, the physical engine may directly perform collision detection on the first rigid body bound to the first model and the second rigid body bound to the second model, without performing multiple collision detections on the first model and the second model, whereby the number of collision detections can be effectively reduced, thereby reducing the computation amount of the computer device and improving the fluency of collision simulation. Furthermore, manual participation in model building is not required in the creation process of the original models. Therefore, in the entire process of collision simulation, the labor cost can be reduced, and time consumed for model building can also be saved, so as to improve the efficiency of collision simulation.

FIG. 1 is a schematic structural diagram of a network architecture according to some embodiments. As shown in FIG. 1, the network architecture may include a server 10 and a user terminal cluster. The user terminal cluster may include one or more user terminals, and the number of user terminals is not limited herein. As shown in FIG. 1, user terminal 100*a*, user terminal 100*b*, user terminal 100*c* . . . and user terminal 100*n* may be specifically included. User terminal 100*a*, user terminal 100*b*, user terminal 100*c* . . . and user terminal 100*n* may be connected to the server 10 over a network respectively, whereby each user terminal may perform data interaction with the server 10 through the network connection. The connection manner is not limited for the network connection herein, and the network connection may be direct or indirect connection in a wired communication manner, may be direct or indirect connection in a wireless communication manner, and may also be other manners. This is not limited herein.

The user terminals in the user terminal cluster may, for example, include: smart terminals such as smart phones, tablet computers, notebook computers, desktop computers, wearable devices, smart homes, and head-mounted devices. It is to be understood that a model creation engine may be operated on a browser platform of each user terminal in the user terminal cluster shown in FIG. 1. The model creation engine herein is a multidimensional engine (such as a two-dimensional engine or a three-dimensional engine) for creating an original model. The model creation engine herein may be, for example, a Threejs engine. The Threejs engine is a three-dimensional engine (also referred to as a 3D engine) operated in a browser. A computer device (for example, the server 10 shown in FIG. 1) having a collision simulation function in some embodiments may create various three-dimensional scenarios in a distributed graphical information system (World Wide Web, referred to as Web for short) through the Threejs engine. The Threejs engine is an easy-to-use 3D graphics library formed by encapsulating and simplifying a Web Graphics Library (WebGL) interface, which includes various objects such as a camera, a shadow, and a material.

The original model created by the model creation engine may be a virtual object associated with a target application (i.e. an application client) in the user terminal. The application client herein may include social clients, multimedia clients (e.g. video clients), entertainment clients (e.g. game clients), educational clients, live clients, etc. The application client may be an independent client, or may be an embedded sub-client (e.g. an applet, etc.) integrated into a client (e.g. a social client, an educational client, a multimedia client, etc.). This is not limited herein. For example, in a game scene, the original model may be a virtual object (e.g. a virtual gun, a virtual iron ball, a virtual wall, etc.) in a virtual game corresponding to a game client. In some embodiments, the original model created by the model creation engine may also be a simulation model corresponding to a real object in the real world. For example, the original model may be an involved vehicle for simulating a car accident scene in order to assist a traffic policeman in restoring a traffic accident. Furthermore, the original model may also be a model in other scenarios. This is not limited herein.

As shown in FIG. 1, the server 10 in some embodiments may be a server corresponding to the browser platform. The server 10 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data an artificial intelligence platform.

For ease of understanding, in some embodiments, one user terminal may be selected from the plurality of user terminals shown in FIG. 1 as a target user terminal configured to display cutting data. The cutting data herein may be an animation file generated by a computer device in the process of collision simulation based on a physical engine. For example, in some embodiments, the user terminal 100*a* shown in FIG. 1 may be taken as a target user terminal.

The physical engine in some embodiments can bind a rigid body to an original model created by a model creation engine, and then may assign a physical attribute of the rigid body acquired in real time to the corresponding original model, so as to control the original model to execute a corresponding physical motion. The rigid body herein refers to an object with a constant shape and size, and constant relative positions of internal points after motion and stress. It is to be understood that an absolutely rigid body does not actually exist and is only an ideal model. The rigid body is often used in the physical engine to reduce the computation amount when simulating physical attributes of objects. It is to be understood that the physical engine may compute motion, rotation and collision reflections by way of assigning real physical attributes to objects.

When the physical engine detects that a first rigid body having a first physical attribute collides with a second rigid body having a second physical attribute, it is necessary to determine an initial cutting model from a first model corresponding to the first rigid body and a second model corresponding to the second rigid body, determine a collision point at which the first rigid body collides with the second rigid body, and normal vector information corresponding to the collision point based on the physical engine, and determine a first cutting surface in the initial cutting model, so as to simulate a simulation effect of breaking the initial cutting model into fragments. The first model and the second model in some embodiments are complete and independent original models, rather than models built by other small independent models. Therefore, in the process of collision simulation, there is no need for a user to participate in the process of model building, so that the labor cost is reduced, and time consumed for model building is also saved, so as to improve the efficiency of collision simulation. Furthermore, the first model and the second model are independent original models, and one original model corresponds to one rigid body. Therefore, when the physical engine detects that the first model collides with the second model, a computer device may perform collision detection only on the first rigid body bound to the first model and the second rigid body bound to the second model, without performing multiple collision detections on the same model, whereby the number of collision detections can be effectively reduced, thereby reducing the computation amount of the computer device and improving the fluency of collision simulation.

Figure 2:
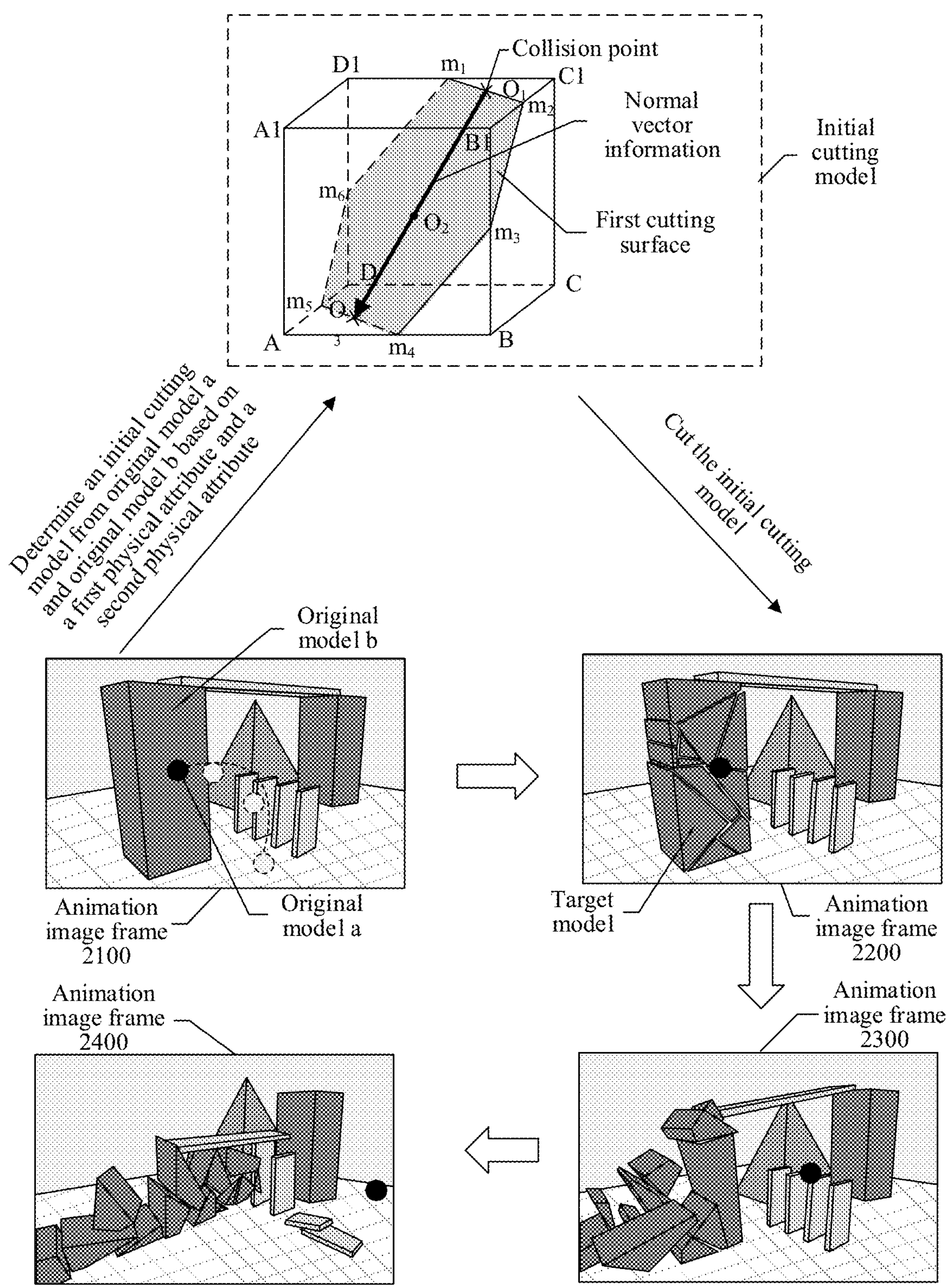
FIG. 2 is a schematic diagram of a scenario of data interaction according to some embodiments.

FIG. 2 is a schematic diagram of a scenario of data interaction according to some embodiments. As shown in FIG. 2, a computer device in some embodiments may achieve a simulation effect of breaking a model into fragments through a physical engine. The entire process may be specifically divided into three stages: model scenario, collision detection, and physical simulation. The computer device may be the server 10 shown in FIG. 1.

In the stage of model scenario, the computer device may start a model creation engine (e.g. a Threejs engine) associated with a browser platform, and may create an original model that requires collision simulation, based on the model creation engine. The original model may include original model a, original model b . . . and original model n. As shown in FIG. 2, original model a in an animation image frame 2100 may be a virtual iron ball in a game, original model b may be a virtual building (e.g. a wall) in the game, and original model c may be another virtual building in the game, without enumeration herein. Further, since the physical engine needs to perform physical simulation on a rigid body and the original model created by the model creation engine does not have a rigid body bound by default, the computer device needs to bind a rigid body to an original model based on the physical engine, and one original model corresponds to one rigid body. For example, the computer device may bind, based on the physical engine, rigid body 20 A to original model a as shown in FIG. 2, bind rigid body 20 B to original model b as shown in FIG. 2, and so on.

The physical engine may refresh a physical attribute of a rigid body in each frame of picture in the browser platform, and then may assign the acquired physical attribute of the rigid body to the original model bound thereto, so as to control the original model to perform a physical motion in the browser platform, thereby detecting whether there are two rigid bodies in collision based on the physical attribute of each rigid body. The physical attribute herein may include attribute information such as position information, linear velocity, angular velocity, rotation angle, friction coefficient, momentum, and impulse of a rigid body. The impulse is a physical quantity that represents an accumulation effect on particles for a period of time, and is the reason to change the mechanical motion state of particles.

In the stage of collision detection, in the animation image frame 2100, the computer device may detect that rigid body 20 A has collided with rigid body 20 B based on a physical attribute (i.e. a first physical attribute) of rigid body 20 A and a physical attribute (i.e. a second physical attribute) of rigid body 20 B. At this moment, the computer device may determine an initial cutting model (e.g. original model b) from original model a and original model b based on the physical attribute of rigid body 20 A and the physical attribute of rigid body 20 B. The initial cutting model herein may be determined based on density information of original model a and density information of original model b.

In the stage of physical simulation, in the initial cutting model, the computer device may capture a collision point (e.g. coordinate point O1 shown in FIG. 2) between rigid body 20 A and rigid body 20 B through the physical engine, and may then determine normal vector information corresponding to the collision point based on collision data associated with the collision point. The normal vector information herein may include a normal vector length and a normal vector direction of a normal vector associated with the collision point. The normal vector length (e.g. a length between coordinate point O1 and coordinate point O3 shown in FIG. 2) may be determined based on a collision impulse generated when rigid body A collides with rigid body B. The normal vector direction (e.g. a direction in which coordinate point O1 points to coordinate point O3 shown in FIG. 2) is an impulse direction of the collision impulse.

At this moment, the computer device may acquire model information of the initial cutting model. The model information herein may include a model size of the initial cutting model, model shape information (e.g. cube), and a geometric material. As shown in FIG. 2, the model shape information of the initial cutting model may include vertex information (e.g. eight vertices: vertex A1, vertex B1, vertex C1, vertex D1, vertex A, vertex B, vertex C, and vertex D), and central point information (e.g. central point O2) of the initial cutting model. Further, the computer device may determine a first cutting surface as shown in FIG. 2 in the initial cutting model based on the collision point, the normal vector information, and the model information of the initial cutting model. Cutting point m1, cutting point m2, cutting point m3, cutting point m4, cutting point m5, and cutting point m6 in the initial cutting model are intersection points between the first cutting surface and a contour line of the initial cutting model. Further, the computer device may cut the initial cutting model based on the first cutting surface.

Furthermore, the computer device may also acquire a cutting end condition associated with the physical engine. The cutting end condition herein may mean that a model size of the cut model is less than or equal to a model size threshold. The cutting end condition may also mean that the number of cuts recorded in this process of collision simulation reaches a number-of-cuts threshold. If the cut model does not satisfy the cutting end condition, the computer device may take the model obtained by cutting the initial cutting model as a target cutting model, and then re-cut the target cutting model until the cut model satisfies the cutting end condition. If the cut model satisfies the cutting end condition, the computer device may take the model satisfying the cutting end condition as a target model. As shown in FIG. 2, a target model in an animation image frame 2200 may be a model satisfying a cutting end condition obtained by the computer device cutting original model b.

Further, the computer device may bind a target rigid body to the target model through the physical engine, may also determine a linear velocity and an angular velocity of the target rigid body according to an impulse so as to acquire a physical attribute of the target rigid body, and may then control the target model to collapse under gravity simulation based on the physical attribute of the target rigid body being assigned to the target model so as to obtain cutting data for presentation on a mobile terminal (any one user terminal in the user terminal cluster shown in FIG. 1, such as user terminal 100*a*). The cutting data is obtained based on the animation image frame 2100, the animation image frame 2200, an animation image frame 2300, and an animation image frame 2400 shown in FIG. 2, and the animation image frame 2300 and the animation image frame 2400 may be animation image frames at two different times acquired by the computer device under gravity simulation.

The physical engine in some embodiments may bind a rigid body to each original model, and one original model corresponds to one rigid body. Since original model a and original model b are independent original models, rather than models built by multiple independent models, the computer device does not need to perform multiple collision detections on original model a and original model b, whereby the number of collision detections can be effectively reduced, thereby reducing the computation amount of the computer device and improving the fluency of collision simulation. Manual participation in model building for original model a and original model b is not required in some embodiments. Therefore, in the entire process of collision simulation, the labor cost can be reduced, and time consumed for model building can also be saved, so as to improve the efficiency of collision simulation.

When the physical engine detects that a first rigid body collides with a second rigid body, a computer device having a collision simulation function may cut an initial cutting model determined from a first model corresponding to the first rigid body and a second model corresponding to the second rigid body using the automatic process of the physical engine and a program. The specific implementation may be seen from the following embodiments corresponding to FIGS. 3-10.

Figure 3:
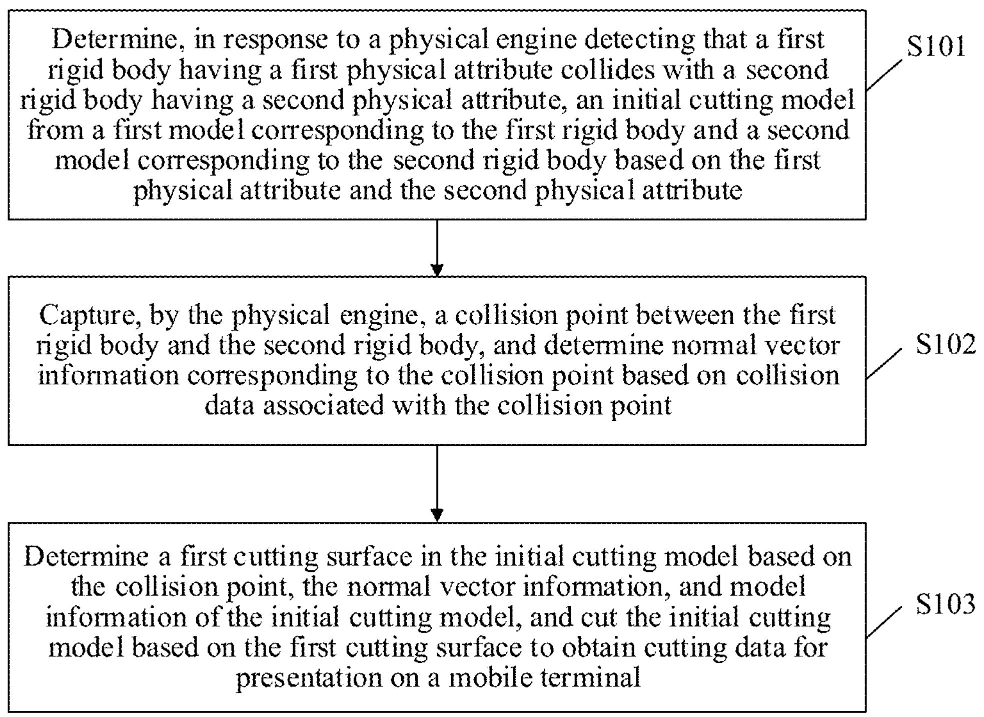
FIG. 3 is a schematic flowchart of a collision data processing method according to some embodiments.

FIG. 3 is a schematic flowchart of a collision data processing method according to some embodiments. As shown in FIG. 3, the method may be performed by a computer device having a collision simulation function. The computer device may be a user terminal (e.g. user terminal 100*a* shown in FIG. 1) or a server (e.g. the server 10 shown in FIG. 1). This is not limited herein. For convenience of understanding, some embodiments are illustrated with an example where the method is performed by a server. The method may include at least the following operations S101-S103:

Operation S101: Determine, in response to a physical engine detecting that a first rigid body having a first physical attribute collides with a second rigid body having a second physical attribute, an initial cutting model from a first model corresponding to the first rigid body and a second model corresponding to the second rigid body based on the first physical attribute and the second physical attribute.

Specifically, a physical engine may be introduced by a computer device having a collision simulation function so as to acquire physical attributes of rigid bodies bound to original models in real time, thereby detecting whether there are two rigid bodies in collision. In response to the physical engine detecting that a first rigid body having a first physical attribute collides with a second rigid body having a second physical attribute, the computer device may determine an initial cutting model from a first model corresponding to the first rigid body and a second model corresponding to the second rigid body based on the first physical attribute and the second physical attribute. The initial cutting model may be determined based on density information of the model, and the density information may be obtained according to a physical attribute of a corresponding rigid body.

For example, the computer device may determine density information of the first model corresponding to the first rigid body from the first physical attribute and determine density information of the second model corresponding to the second rigid body from the second physical attribute. Further, the computer device may determine a model having less density information from the first model and the second model based on the two pieces of density information, and may then take the model as the initial cutting model.

In some embodiments, the initial cutting model may also be preset by a development user. For example, the development user may preset that when a virtual bullet in a game is fired to a virtual wall (i.e. the virtual bullet collides with the virtual wall), the virtual wall is broken. At this moment, the computer device may directly take a broken object (i.e. virtual wall), which is set by the development user, as the initial cutting model. The initial cutting model may also be determined in other forms, and the determination manner is not limited herein.

The process of collision simulation in some embodiments may include three stages: model scenario, collision detection, and physical simulation. It is to be understood that the computer device may create some original models in a model scenario (e.g. a 3D scenario) associated with a browser platform. None of the original models herein are stacked from multiple small independent blocks, but are independent models created by a model creation engine. For example, the original model herein may be a standard geometry created by 3D production software. It is not necessary to manually participate in the model building process of such an original model, whereby 3D technicians may be freed from the heavy work of model fragment combination, which not only saves the labor cost, but also saves the time consumed for model building, thereby improving the efficiency of collision simulation.

Further, the computer device may quickly access a physical engine through several lines of code, so as to achieve a simulation effect of breaking the original model. The physical engine simulates rigid body behaviors by using object attributes (momentum, torque, elasticity, etc.), which not only achieves a more realistic simulation effect, but also is easier for the development user to master than writing behavior scripts. For example, the physical engine in some embodiments may be an Ammo.js physical engine. The Ammo.js physical engine may assist in dealing with collisions between original models and simulating physical phenomena such as gravity effects.

A Bullet Physics physical simulation engine is an open source physical model engine which can be widely used in game development and movie production. In order to use the Bullet Physics physical simulation engine in a browser platform, according to some embodiments, the Bullet Physics physical simulation engine may be transplanted to a JavaScript language through the Ammo.js physical engine so as to use the functions of the Bullet Physics physical simulation engine in the browser platform of a mobile terminal through the JavaScript language. The Bullet Physics physical simulation engine herein can use a GPU to complete physical simulation computation, the GPU has parallel computing and floating-point computing capabilities that cannot be matched by a CPU, while the complex physical simulation computation relies on the parallel computing and floating-point computing capabilities.

Pseudo-code (e.g. pseudo-code 1) with which the computer device introduces a physical engine may be as follows:

```
"//default collision configuration information
varcollisionConfiguration = new Ammo.btDefaultCollisionConfiguration( );
//default collision dispatcher
vardispatcher = new Ammo.btCollisionDispatcher(collisionConfiguration);
//rigid body collision information, where rigid body pairs that may collide with each
other may be screened within a short time
broadphase = new Ammo.btDbvtBroadphase( );
//constraint solver
solver = new Ammo.btSequentialImpulseConstraintSolver( );
//physics world in which all rigid bodies are physically simulated
physicsWorld= new Ammo.btDiscreteDvnamicsWorld(dispatcher,broadphase,
solver,collisionConfiguration);
//set a weight value for a physics world
physicsWorld.setGravity(new Ammo.btVector3(0,-9.8,0));"
```

In pseudo-code 1, collision configuration information may be used for configuring information such as high-speed collision detection, stack allocators, and pool memory allocators. The computer device in some embodiments may invoke a collision dispatcher, whereby a constraint solver can screen rigid body pairs (i.e. candidate contact pairs) which may collide with each other within a short time based on rigid body collision information.

A physical engine is a physical simulation of a rigid body. In other words, the physical engine acts on the rigid body rather than directly on an original model. Since an original model created by a model creation engine in 3D software does not have a rigid body bound by default, the rigid body needs to be bound to the original model first in the process of achieving a model breaking effect through the physical engine. It is to be understood that rigid bodies may be set visually in various mainstream 3D software (e.g. Unity or Unreal, etc.), and may also be added through a program code, and the rigid bodies are invisible by default during project running.

The rigid body information for creating the rigid body may include rigid body shape information, rigid body mass information, rigid body behavior information, and rigid body inertia information. The original model is an independent model, thereby reducing the number of collision detections. Therefore, the computation amount of the computer device is small, and in order to improve the collision accuracy, the rigid body shape information may be closer to the model shape information. In some embodiments, in order to simplify computation during collision, the rigid body shape information may be a standard geometry including a model. In other words, the rigid body shape information may be different from the model shape information.

For example, the computer device may start a model creation engine associated with a browser platform, and may then create N original models for a game corresponding to a game client through the model creation engine. N is a positive integer greater than or equal to 2. The N original models may include the first model and the second model. The computer device may determine first model information of the first model based on the physical engine, and may then determine first rigid body information of the first rigid body including the first model according to the first model information. Further, the computer device may create the first rigid body to be bound with the first model based on the first rigid body information, and bind the first rigid body with a first variable parameter in the first model. The first variable parameter may be used for instructing the physical engine to determine the first rigid body corresponding to the first model. Similarly, the computer device may determine second model information of the second model based on the physical engine, and may then determine second rigid body information of the second rigid body including the second model according to the second model information. Further, the computer device may create the second rigid body to be bound with the second model based on the second rigid body information, and bind the second rigid body with a second variable parameter in the second model. The second variable parameter may be used for instructing the physical engine to determine the second rigid body corresponding to the second model.

For example, pseudo-code (e.g. pseudo-code 2) with which the computer device binds a rigid body to an original model (e.g. a 3D sphere) through the physical engine may be as follows:

```
"//create a 3D sphere through Threejs
var ball =new THREE.Mesh(new THREE.SphereBufferGeometry(ballRadius,
14,10),ballMaterial);
//create a spherical rigid body shape through Ammo.js
varballshape = new Ammo.btSphereShape(ballRadius);
//rigid body information, where mass is rigid body mass information, motionState is
rigid body behavior information, ballshape is rigid body shape information, and
localInertia is rigid body inertia information;
varrbInfo= new
Ammo.btRigidBodvConstructionInfo(mass,motionState,ball-shape,localInertia);
//create a rigid body using rigid body information
var body = new Ammo.btRigidBody(rbInfo);
//bind rigid bodies to a userData.physicsBody variable of a 3D model, through which
rigid bodies bound to the model may subsequently be acquired
ball.userData.physicsBody =body;"
```

It is to be understood that rigid mass information and rigid shape information are two more important attributes. As a value indicated by the rigid body mass information is greater, energy required to change the motion state of the rigid body is higher, and the rigid body shape information determines a collision detection range from a rigid body to a rigid body.

Figure 4A:
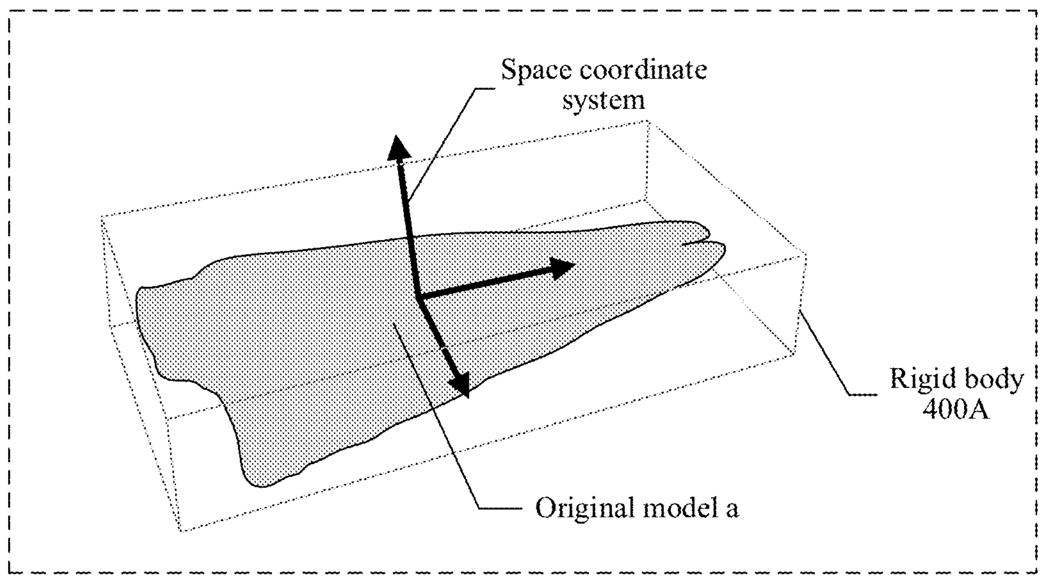
FIG. 4A is a schematic diagram of a scenario of binding a rigid body to an original model according to some embodiments.

FIG. 4A is a schematic diagram of a scenario of binding a rigid body to an original model according to some embodiments. As shown in FIG. 4A, original model a may be an original model created for a game (e.g. a gun game) by a computer device starting a model creation engine associated with a browser platform. For example, original model a may be a game fighter controllable by a game user corresponding to the game.

The premise that a physical engine can act on original model a is to bind a rigid body to original model a. Specifically, a computer device having a collision simulation function may determine model information of original model a based on the physical engine. The model information of original model a may include a model size of original model a, model shape information of original model a, and a geometric material of original model a. Further, the computer device may create rigid body shape information attached to the model information of original model a according to the model information of original model a. In order to reduce the computation amount for subsequent collision detection, the computer device may also select shape information capable of including a standard geometry of original model a as the rigid body shape information of the bound rigid body. Furthermore, the computer device may also acquire rigid body mass information, rigid body behavior information, and rigid body inertia information set by a development user, and may then obtain rigid body information of a rigid body bound with original model a based on these information. Further, the computer device may create a rigid body (e.g. rigid body 400 A shown in FIG. 4A) to be bound with original model a based on the determined rigid body information, and may then bind rigid body 400 A with a variable parameter in original model a. The variable parameter in original model a may be used for instructing the physical engine to determine rigid body 400 A corresponding to original model a.

After rigid body 400 A is successfully bound to original model a, a space coordinate system may be established in original model a with a central point of original model a as a coordinate origin. Rigid body 400 A bound to original model a may be set visually in various mainstream 3D software, and may also be added through a program code, and rigid body 400 A and the space coordinate system in rigid body 400 A are invisible by default during project running.

Figure 4B:
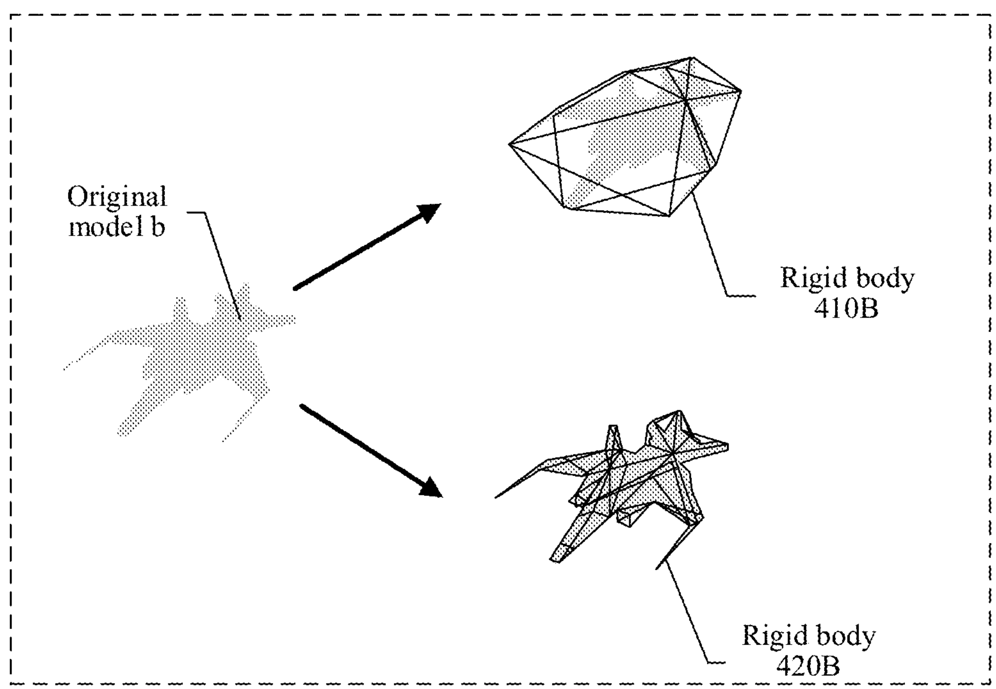
FIG. 4B is a schematic diagram of a scenario of binding a rigid body to an original model according to some embodiments.

FIG. 4B is a schematic diagram of a scenario of binding a rigid body to an original model according to some embodiments. As shown in FIG. 4B, original model b may be another original model created for a game (e.g. a gun game) by a computer device starting a model creation engine associated with a browser platform. For example, original model b may be an enemy fighter in the game.

The computer device needs to bind a rigid body to original model b based on a physical engine to control original model b to perform a physical motion. Specifically, a computer device having a collision simulation function may determine model information of original model b based on the physical engine. The model information of original model b may include a model size of original model b, model shape information of original model b, and a geometric material of original model b. Further, the computer device may create rigid body shape information of a rigid body to be bound to original model b according to the model information of original model b.

In order to reduce the computation amount for subsequent collision detection, the computer device may select shape information capable of including a geometry of original model b as the rigid body shape information of the rigid body to be bound (e.g. rigid body shape information 1), and may then obtain rigid body information including rigid body shape information 1. At this moment, the computer device may create a rigid body (e.g. rigid body 410B shown in FIG. 4B) to be bound with original model b based on the rigid body information including rigid body shape information 1, and may then bind rigid body 410B with a variable parameter in original model b.

In order to improve the accuracy of subsequent collision detection, the computer device may also take model shape information closer to original model b as the rigid body shape information of the rigid body to be bound (e.g. rigid body shape information 2), and may then obtain rigid body information including rigid body shape information 2. At this moment, the computer device may create a rigid body (e.g. rigid body 420 B shown in FIG. 4B) to be bound with original model b based on the rigid body information including rigid body shape information 2, and may then bind rigid body 420 B with a variable parameter in original model b.

The physical engine in the computer device in some embodiments may bind rigid bodies to each original model requiring physical simulation (i.e. collision simulation) according to a rigid body binding method shown in pseudo-code 2, and may then automatically process physical attributes of each rigid body. The physical attribute herein may include attribute information such as position information, linear velocity, angular velocity, rotation angle, friction coefficient, momentum, and impulse. The impulse may be a physical quantity that represents an accumulation effect on particles for a period of time, and is the reason to change the mechanical motion state of particles.

The computer device may refresh a physical attribute of a rigid body in each animation image frame in the browser platform through the physical engine, and may then assign the physical attribute of the rigid body to an original model bound therewith, whereby the original model performs a physical motion according to a motion mode of the rigid body. One original model corresponds to one rigid body.

Furthermore, the computer device may also perform collision detection on the N rigid bodies corresponding to the N original models based on the physical engine. That is, the computer device may acquire physical attributes of N rigid bodies corresponding to N original models based on the physical engine, acquire a reference collision rigid body from the N rigid bodies, and take rigid bodies other than the reference collision rigid body in the N rigid bodies as candidate collision rigid bodies. Further, the computer device may determine a collision region associated with the reference collision rigid body based on a physical attribute of the reference collision rigid body and a collision distance threshold (e.g. 3 cm) corresponding to the physical engine. In other words, the computer device may take a region within 3 cm from the reference collision rigid body as a collision region associated with the reference collision rigid body based on position information of the reference collision rigid body.

In the presence of a candidate collision rigid body, falling into the collision region, among the candidate collision rigid bodies, the computer device may determine the candidate collision rigid body falling into the collision region as a target collision rigid body, and may then form candidate contact pairs by the target collision rigid body and the reference collision rigid body. Further, the computer device may acquire a collision detection condition, perform collision detection on the candidate contact pairs based on the collision detection condition, screen a candidate contact pair satisfying the collision detection condition from the respective candidate contact pairs, and take the screened candidate contact pair as a collision group. The reference collision rigid body in the collision group may be referred to as the first rigid body in some embodiments. The target collision rigid body in the collision group may be referred to as the second rigid body.

The computer device may perform collision detection on the target collision rigid body and the reference collision rigid body in the candidate contact pairs based on a physical attribute of the target collision rigid body in the candidate contact pairs and the physical attribute of the reference collision rigid body in the candidate contact pairs. In specific implementations, using a ray-based collision detection method, the computer device may determine a first predicted contact point in the target collision rigid body, determine a second predicted contact point corresponding to the first predicted contact point in the reference collision rigid body, and determine a predicted distance between the first predicted contact point and the second predicted contact point through the physical engine.

Further, the computer device may acquire a collision detection condition. The collision detection condition may be used for screening candidate contact pairs having non-positive predicted distances. In other words, if the predicted distance between the first predicted contact point and the second predicted contact point is less than or equal to zero, the computer device may take the candidate contact pairs to which the target collision rigid body and the reference collision rigid body belong as a candidate contact pair satisfying the collision detection condition. If the predicted distance between the first predicted contact point and the second predicted contact point is greater than zero, the computer device may take the candidate contact pairs to which the target collision rigid body and the reference collision rigid body belong as a candidate contact pair not satisfying the collision detection condition. The computer device may screen the candidate contact pair satisfying the collision detection condition as a collision group from the respective candidate contact pairs.

Figure 5:
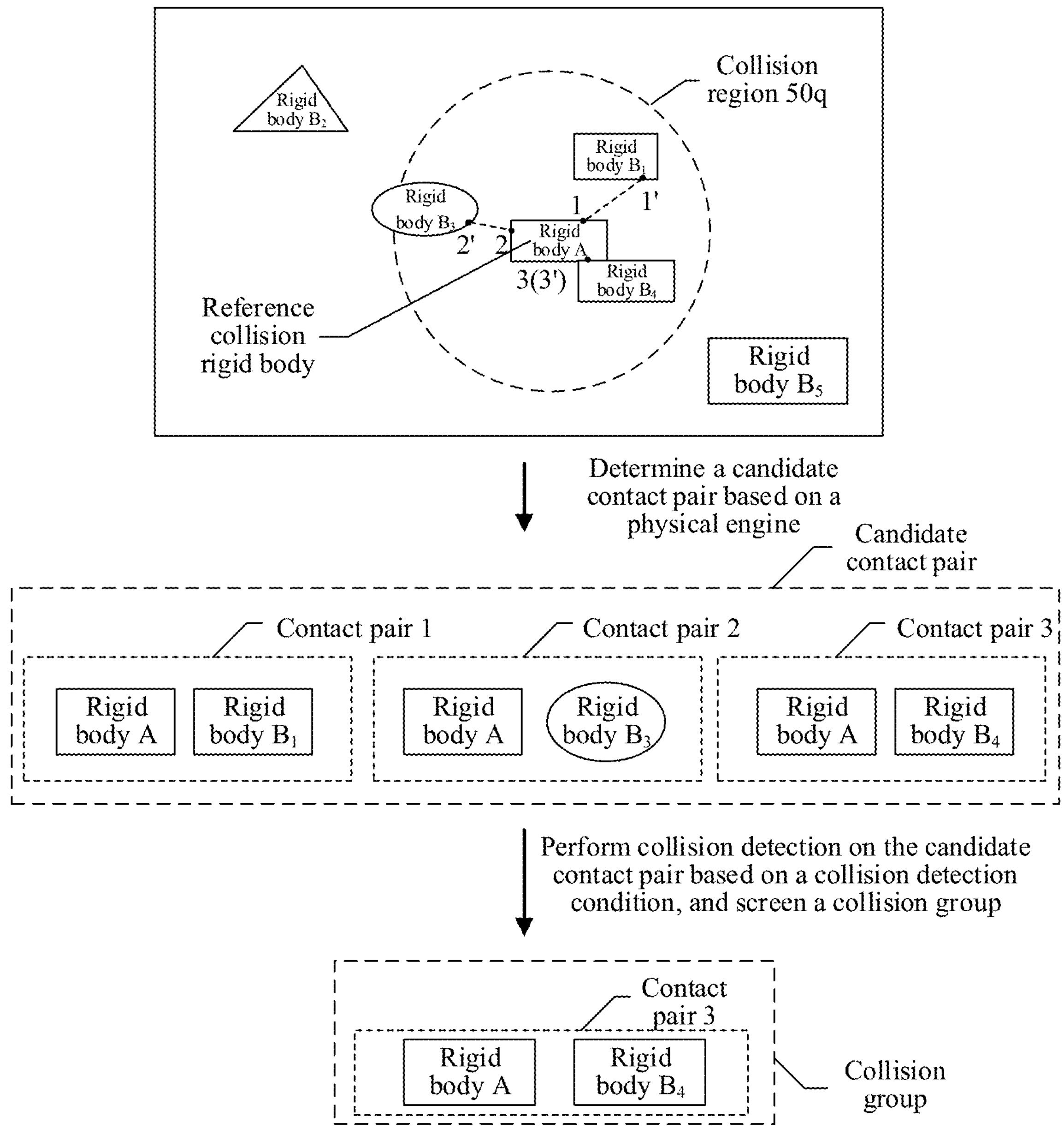
FIG. 5 is a schematic diagram of a scenario of determining a collision group according to some embodiments.

FIG. 5 is a schematic diagram of a scenario of determining a collision group according to some embodiments. As shown in FIG. 5, a computer device in some embodiments may bind a rigid body to each original model requiring physical simulation (i.e. collision simulation), and one original model corresponds to one rigid body. In order to explain the determination process of a collision group, the computer device may acquire, in an example where the total number of original models is 6, physical attributes of six rigid bodies corresponding to the six original models based on a physical engine below. The six rigid bodies may specifically include rigid body A, rigid body B1, rigid body B2, rigid body B3, rigid body B4, and rigid body B5.

The reference collision rigid body determined by the computer device may be any one of the six rigid bodies. For example, if rigid body A shown in FIG. 5 is a virtual object controlled by a game user in a certain game, for example, a game bullet. At this moment, the computer device may take rigid body A as a reference collision rigid body, and may then take rigid bodies other than rigid body A in the six rigid bodies as candidate collision rigid bodies. For example, rigid body B1, rigid body B2, rigid body B3, rigid body B4, and rigid body B5 are all taken as candidate collision rigid bodies.

The computer device may determine position information of rigid body A from a physical attribute of rigid body A, and may then determine a collision region (e.g. collision region 50*q* shown in FIG. 5) associated with rigid body A based on position information of rigid body A and a collision distance threshold (e.g. 3 cm) corresponding to the physical engine.

Further, the computer device may detect collision region 50*q*. In the presence of a candidate collision rigid body, falling into collision region 50*q*, among the candidate collision rigid bodies, the computer device may determine the candidate collision rigid body falling into collision region 50*q* as a target collision rigid body, and may then take the target collision rigid body and the reference collision rigid body as candidate contact pairs. As shown in FIG. 5, there are rigid bodies B1, B3, and B4 in collision region 50*q*. At this moment, the computer device may take these three rigid bodies as target collision rigid bodies, and may then determine candidate contact pairs associated with rigid body A. Candidate contact pairs determined by the computer device may include contact pair 1, contact pair 2, and contact pair 3. Contact pair 1 may be composed of rigid body A and rigid body B1. Contact pair 2 may be composed of rigid body A and rigid body B3. Contact pair 3 may be composed of rigid body A and rigid body B4.

Further, the computer device may predict a predicted contact point in each contact pair based on physical attributes of the two rigid bodies in each contact pair using a ray-based collision detection method. For example, the computer device may predict a possible contact point (i.e. a predicted contact point) when the two rigid bodies in the contact pair collide based on the linear velocity, position information, angular velocity, rotation angle, etc. of the two rigid bodies, and may then determine whether the two rigid bodies intersect based on the acquired collision detection condition, so as to screen candidate contact pairs which may collide.

For contact pair 1, the computer device may determine that a predicted distance between a first predicted contact point in rigid body A (e.g. predicted contact point 1 shown in FIG. 5) and a second predicted contact point in rigid body B1 (e.g. predicted contact point 1' shown in FIG. 5) is greater than 0. At this moment, the computer device may determine contact pair 1 as a candidate contact pair not satisfying the collision detection condition, i.e. the two rigid bodies in contact pair 1 do not collide. Similarly, for contact pair 2, the computer device may determine that a predicted distance between a first predicted contact point in rigid body A (e.g. predicted contact point 2 shown in FIG. 5) and a second predicted contact point in rigid body B3 (e.g. predicted contact point T shown in FIG. 5) is greater than 0. At this moment, the computer device may determine contact pair 2 as a candidate contact pair not satisfying the collision detection condition. Similarly, for contact pair 3, the computer device may determine that a predicted distance between a first predicted contact point in rigid body A (e.g. predicted contact point 3 shown in FIG. 5) and a second predicted contact point in rigid body B4 (e.g. predicted contact point 3' shown in FIG. 5) is equal to 0. At this moment, the computer device may determine contact pair 3 as a candidate contact pair satisfying the collision detection condition. In other words, rigid body A and rigid body B4 may collide, i.e. contact pair 3 is a collision group. At this moment, the computer device may take rigid body A in contact pair 3 as a first rigid body and rigid body B4 in contact pair 3 as a second rigid body.

Further, the computer device may determine an initial cutting model from an original model (i.e. a first model) corresponding to rigid body A and an original model (i.e. a second model) corresponding to rigid body B4 based on a first physical attribute of rigid body A and a second physical attribute of rigid body B4. For example, if the first physical attribute indicates that density information of the original model corresponding to rigid body A is density information 1, the second physical attribute indicates that density information of the original model corresponding to rigid body B4 is density information 2, and density information 1 is less than density information 2, the computer device may take the original model corresponding to rigid body A as the initial cutting model.

It is to be understood that each of the six rigid bodies shown in FIG. 5 may be regarded as a reference collision rigid body. For example, when rigid body B1 is taken as a reference collision rigid body, the computer device may determine a target collision rigid body from candidate collision rigid bodies (e.g. rigid body A, rigid body B2, rigid body B3, rigid body B4, and rigid body B5) based on a collision region associated with rigid body B1 so as to form candidate contact pairs, and may then screen a collision group satisfying the collision detection condition, and details are not described herein again.

Operation S102: Capture, by the physical engine, a collision point between the first rigid body and the second rigid body, and determine normal vector information corresponding to the collision point based on collision data associated with the collision point.

Specifically, the computer device may capture, by the physical engine, a collision point at which the first rigid body collides with the second rigid body in a model coordinate system (i.e. a world coordinate system of a physics world where collision simulation is located) where the initial cutting model is located. Further, the computer device may also acquire, by the physical engine, a collision impulse generated in response to the first rigid body colliding with the second rigid body, and an impulse direction of the collision impulse, determine a normal vector length of a normal vector associated with the collision point according to the collision impulse, and determine a normal vector direction of the normal vector according to the impulse direction. At this moment, the computer device may determine normal vector information corresponding to the collision point based on the normal vector direction and the normal vector length.

Pseudo-code (e.g. pseudo-code 3) with which the computer device performs collision detection and determines a collision point and normal vector information may be as follows:

```
"for (vari=0,il=dispatcher.getNumManifolds( );i<il;i++)
  {
    varcontactManifold = dispatcher.getManifoldByIndexInternal(i);//acquire each
candidate contact pair from a collision dispatcher
    for(var j=0,jl=contactManifold.getNumContacts( );j<jl;j++)
    {
    varcontactPoint = contactManifold.getContactPoint(j);//acquire each predicted
contact point from candidate contact pairs
    if (contactPoint. getDistance( )≤0)//if two rigid bodies intersect, determine that
collision (impact) occurs
      {
    var impulse = contactPoint.getAppliedImpulse( );//collision impulse
    varpos = contactPoint.get_m_positionWorld0nB( );//coordinates of collision
point
    var normal = contactPoint.get_m_normalWorld0nB( );//normal vector
      }
    }
  }"
```

The physical engine in some embodiments may return information of all possible colliding rigid body pairs in the form of candidate contact pairs (collision groups, i.e. contactManifold). According to the content shown in pseudo-code 3: the computer device may invoke a collision dispatcher to acquire each detected candidate contact pair, and may then determine whether two rigid bodies in each candidate contact pair intersect based on the collision detection condition. Rigid body intersection means that the distance between corresponding predicted contact points on two rigid bodies in a candidate contact pair is less than or equal to zero. il may represent the total number of candidate contact pairs determined by the computer device, and jl may represent the total number of predicted contact points of a certain candidate contact pair determined by the computer device. When the collision of two rigid bodies is detected, the computer device may determine a collision impulse when the two rigid bodies collide, and capture coordinate information of a collision point, and then determine normal vector information corresponding to the collision point.

Figure 6:
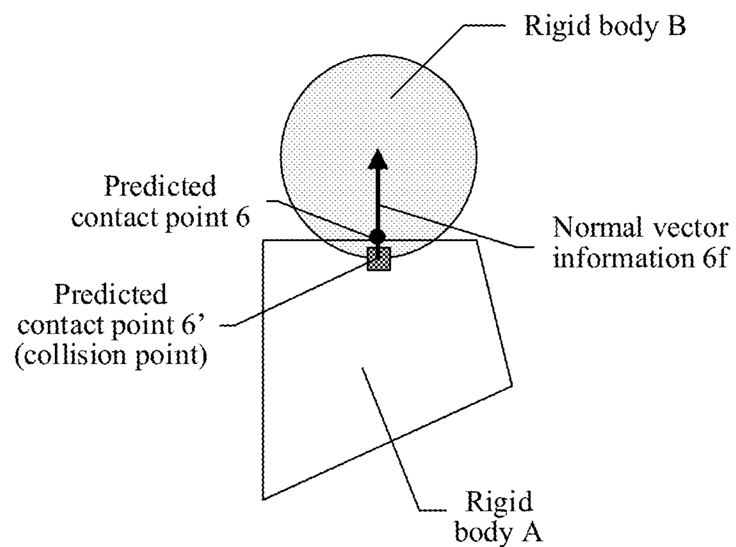
FIG. 6 is a schematic diagram of a scenario of determining normal vector information according to some embodiments.

FIG. 6 is a schematic diagram of a scenario of determining normal vector information according to some embodiments. As shown in FIG. 6, rigid body A and rigid body B in some embodiments may be candidate contact pairs acquired by a computer device through a collision dispatcher. Rigid body A and rigid body B are rigid bodies bound to two original models created by the computer device for a model creation engine through a physical engine. One original model corresponds to one rigid body.

The computer device may determine predicted contact point 6 (i.e. a first predicted contact point) in rigid body A and predicted contact point 6' (i.e. a second predicted contact point) corresponding to predicted contact point 6 in rigid body B through the physical engine, and may then determine a predicted distance between predicted contact point 6 and predicted contact point 6'. As shown in FIG. 6, the predicted distance between predicted contact point 6 and predicted contact point 6' is less than zero. At this moment, the computer device may determine that rigid body A and rigid body B are two rigid bodies in collision.

Further, the computer device may determine that an original model corresponding to rigid body B is an initial cutting model based on a physical attribute of rigid body A and a physical attribute of rigid body B. At this moment, the computer device may capture a collision point (i.e. predicted contact point 6' shown in FIG. 6) at which rigid body A collides with rigid body B through the physical engine in a model coordinate system of the original model corresponding to rigid body B. Further, the computer device may acquire, by the physical engine, a collision impulse generated in response to rigid body A colliding with rigid body B, and an impulse direction of the collision impulse, determine a normal vector length of a normal vector associated with collision point 6 shown in FIG. 6 according to the collision impulse, and determine a normal vector direction of the normal vector according to the impulse direction of the collision impulse. Further, the computer device may determine normal vector information (e.g. normal vector information 6*f* shown in FIG. 6) corresponding to the collision point based on the normal vector length and the normal vector direction.

Operation S103: Determine a first cutting surface in the initial cutting model based on the collision point, the normal vector information, and model information of the initial cutting model, and cut the initial cutting model based on the first cutting surface to obtain cutting data for presentation on a mobile terminal.

Specifically, the computer device may determine a space coordinate system with a central point of the initial cutting model as a coordinate origin in a model coordinate system where the initial cutting model is located, determine first central position information of the central point of the initial cutting model in the space coordinate system based on relative coordinate conversion information between the model coordinate system and the space coordinate system, and determine collision position information of the collision point in the space coordinate system. Further, the computer device may determine a first cutting surface in the initial cutting model based on the first central position information, the collision position information, and the normal vector information, and cut the initial cutting model based on the first cutting surface to obtain cutting data for presentation on a mobile terminal. The cutting data may be used for representing a collision effect between the first model and the second model.

It is to be understood that the model coordinate system where the initial cutting model is located may refer to a world coordinate system of a physics world where the collision simulation is located. In the cutting process for the initial cutting model, the computer device may establish a space coordinate system with the central point of the initial cutting model as an origin point in the initial cutting model so as to acquire coordinate position information of respective coordinate points in the initial cutting model. The origin of the space coordinate system may, certainly, be another coordinate point associated with the initial cutting model, e.g. a certain vertex. The origin of the space coordinate system is not limited herein. Relative coordinate conversion information between the model coordinate system and the space coordinate system may be used for instructing the computer device to convert coordinate position information of a certain coordinate point. For example, the central position information of the central point of the initial cutting model in the model coordinate system may be (23000, 59456, 20361), and the central position information of the central point of the initial cutting model determined by the computer device based on the relative coordinate conversion information may be (0, 0, 0) in the space coordinate system. It can be seen therefrom that the conversion of the coordinate system may simplify the coordinate position information of the coordinate points in the initial cutting model, and may then facilitate the subsequent determination of a surface-to-be-cut, so as to reduce the computational complexity of the computer device.

The normal vector information may include a normal vector length and a normal vector direction of a normal vector associated with the collision point. The normal vector length is determined based on a collision impulse generated in response to the first rigid body colliding with the second rigid body. The normal vector direction may be an impulse direction of the impact impulse.

In the process of determining a first cutting surface of the initial cutting model, the computer device may determine a central point corresponding to the first central position information as a first auxiliary point (e.g. coordinate point O2 in the initial cutting model shown in FIG. 2), determine the collision point corresponding to the collision position information as a second auxiliary point (e.g. coordinate point O1 in the initial cutting model shown in FIG. 2), and take, along the normal vector direction, a coordinate point corresponding to position information at a distance from the collision position information by the normal vector length as a third auxiliary point (e.g. coordinate point O3 in the initial cutting model shown in FIG. 2). Further, the computer device may determine a first surface-to-be-cut in the initial cutting model based on the first auxiliary point, the second auxiliary point, and the third auxiliary point, and may then determine a first cutting surface based on the first surface-to-be-cut.

In some embodiments, the first surface-to-be-cut may be directly taken as the first cutting surface.

In some embodiments, in order not to make the same collision point produce the same cutting effect at each collision, the computer device may also randomly rotate the first surface-to-be-cut and take the randomly rotated first surface-to-be-cut as the first cutting surface. It is to be understood that the computer device may randomly select an angle as a first angle for rotating the first surface-to-be-cut within an angle interval (e.g. [0, π]) associated with the physical engine, rotate the first surface-to-be-cut according to the first angle by taking the normal vector as a rotation axis and taking the collision point as a rotation point, and take the rotated first surface-to-be-cut as the first cutting surface.

Figure 7:
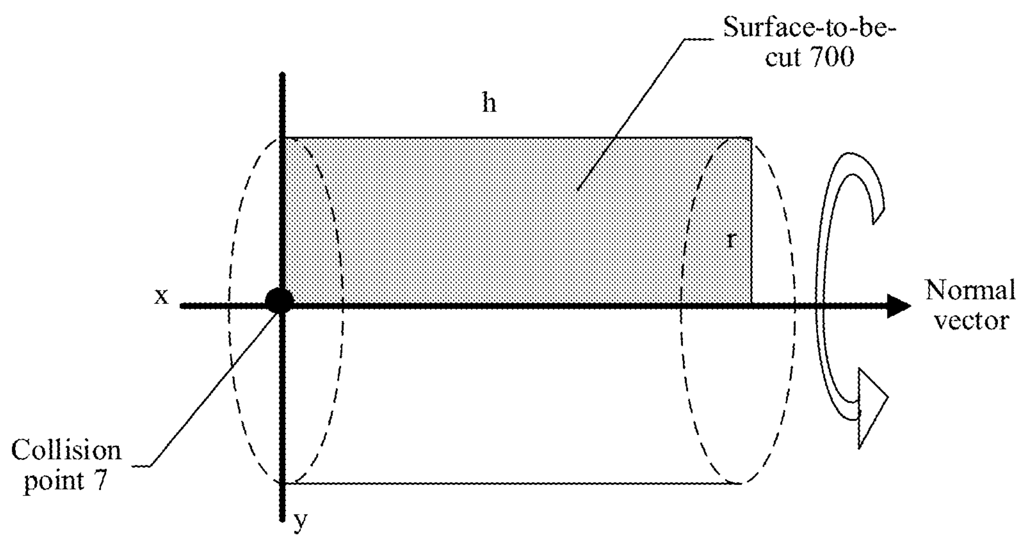
FIG. 7 is a schematic diagram of a scenario of rotating a first surface-to-be-cut according to some embodiments.

FIG. 7 is a schematic diagram of a scenario of rotating a first surface-to-be-cut according to some embodiments. As shown in FIG. 7, a surface-to-be-cut 700 in some embodiments may be a first surface-to-be-cut determined by a computer device in an initial cutting model (e.g. a cylinder model). The computer device herein may be the server 10 shown in FIG. 1.

In some embodiments, the length of the surface-to-be-cut 700 may be a side height h of the cylinder model, and the width of the surface-to-be-cut 700 may be a bottom radius r of the cylinder model. In order not to make the same collision point (e.g. collision point 7) produce the same cutting effect at each collision, the computer device may randomly rotate the surface-to-be-cut 700 shown in FIG. 7 and take the randomly rotated surface-to-be-cut 700 as the first cutting surface. Coordinates x and y shown in FIG. 7 may be used for representing collision position information of collision point 7 in a space coordinate system of the initial cutting model.

The computer device may randomly select an angle as an angle (e.g. π/2) for rotating the surface-to-be-cut 700 within an angle interval (e.g. [0, π]) associated with a physical engine. Further, the computer device may rotate the surface-to-be-cut 700 by π/2 according to a rotation direction shown in FIG. 7 by taking a normal vector shown in FIG. 7 as a rotation axis and collision point 7 as a rotation point, and may then take the surface-to-be-cut 700 rotated by π/2 as a first cutting surface for cutting the cylinder model.

At this moment, the computer device may cut the initial cutting model based on the first cutting surface. Specifically, the computer device may acquire vertex position information of a vertex of the initial cutting model in the space coordinate system of the initial cutting model based on model information of the initial cutting model, determine a contour line of the initial cutting model based on the vertex position information, acquire an intersection point (i.e. a cutting point) between the contour line and the first cutting surface, and determine cutting position information of the cutting point in the space coordinate system.

The intersection points of the first cutting surface with the respective surfaces of the initial cutting model may be calculated using an intersectLine method of a Plane class of a model creation engine (e.g. a Threejs engine). Specifically, pseudo-code (e.g. pseudo-code 4) with which the computer device determines an intersection point between a first cutting surface and a contour line may be as follows:

```
"var plane = new THREE.Plane( );//cutting surface
plane.setFromCoplanarPoints(a,b,c);//three points may determine one plane, a is a
first auxiliary point (e.g. a model central point), b is a second auxiliary point (e.g. a collision point),
and c is a third auxiliary point (e.g. a coordinate point corresponding to position information at a
distance from collision position information by a normal vector length along a normal vector
direction)
var line = new THREE.Line3( );//two vertices may determine one contour line
line.start.copy(p0);//set a start point of a contour line
line.end.copy(p1);//set an end point of a contour line
var intersection = new Vector3( );//intersection point (i.e. cutting point) between a
contour line and a cutting surface
intersection = plane.intersectLine(line,intersection);//detect an intersection point
between a contour line and a plane, and write a result into an intersection parameter"
```

As shown in FIG. 2, the initial cutting model may include eight vertices: vertex A1, vertex B1, vertex C1, vertex D1, vertex A, vertex B, vertex C, and vertex D. The cutting point between the contour line and the first cutting surface, determined by the computer device, may include cutting point m1, cutting point m2, cutting point m3, cutting point m4, cutting point m5, and cutting point m6. Cutting point m1 may be an intersection point between contour line C1D1 and the first surface-to-be-cut. Cutting point m2 may be an intersection point between contour line B1C1 and the first surface-to-be-cut. Cutting point m3 may be an intersection point between contour line BB1 and the first surface-to-be-cut. Cutting point m4 may be an intersection point between contour line AB and the first surface-to-be-cut. Cutting point m5 may be an intersection point between contour line AD and the first surface-to-be-cut. Cutting point m6 may be an intersection point between contour line DD1 and the first surface-to-be-cut.

Further, the computer device may cut the initial cutting model into a first cutting model and a second cutting model based on the cutting position information and the vertex position information, and obtain cutting data for presentation on the mobile terminal based on the first cutting model and the second cutting model. The computer device may determine, by a model creation engine, a geometric material of the initial cutting model from the model information of the initial cutting model, and may then determine a first coordinate array for constructing the first cutting model and a second coordinate array for constructing the second cutting model based on the cutting position information and the vertex position information.

As shown in FIG. 2, the first coordinate array determined by the computer device may include cutting position information of cutting point m1, cutting position information of cutting point m2, cutting position information of cutting point m3, cutting position information of cutting point m4, cutting position information of cutting point m5, cutting position information of cutting point m6, vertex position information of vertex A, vertex position information of vertex A1, vertex position information of vertex D1, and vertex position information of vertex B1. The second coordinate array determined by the computer device may include cutting position information of cutting point m1, cutting position information of cutting point m2, cutting position information of cutting point m3, cutting position information of cutting point m4, cutting position information of cutting point m5, cutting position information of cutting point m6, vertex position information of vertex B, vertex position information of vertex C, vertex position information of vertex D, and vertex position information of vertex C1.

Further, the computer device may create a first geometric structure of the first cutting model by using the first coordinate array, and create the first cutting model based on the first geometric structure and the geometric material. Similarly, the computer device may create a second geometric structure of the second cutting model by using the second coordinate array, and create the second cutting model based on the second geometric structure and the geometric material.

Specifically, the computer device may create a new cut model according to a group of coordinate arrays (e.g. the first coordinate array or the second coordinate array) by using an encapsulated ConvexGeometry of a model creation engine (e.g. a Threejs engine). Specifically, pseudo-code (e.g. pseudo-code 5) with which the computer device determines a new cut model may be as follows:

```
"//create a control geometric structure by using a coordinate array, where a parameter
points is an array composed of multiple vertex coordinates
vargeometry = new ConvexGeometry(points);
//geometry material
var material = new THREE.MeshBasicMaterial({color: 0x00ff00});
//create a new model through a geometric structure and material
var mesh = new THREE.Mesh(geometry,material)"
```

Pseudo-code 5 may be used for cutting the initial cutting model into two new models (i.e. the first cutting model and the second cutting model). Meanwhile, the computer device may remove the initial cutting model from a model scenario so as to complete the process of dividing the initial cutting model into two models.

Further, the computer device may determine the first cutting model and the second cutting model as a target cutting model, acquire a cutting end condition associated with the physical engine, and obtain cutting data for presentation on a mobile terminal in response to the target cutting model satisfying the cutting end condition.

The cutting end condition may include a model size threshold. Based on this, the computer device may acquire a model size of the target cutting model. If the model size of the target cutting model is greater than the model size threshold, the computer device may determine that the target cutting model does not satisfy the cutting end condition. At this moment, the computer device needs to continue cutting the target cutting model. If the model size of the target cutting model is less than or equal to the model size threshold, the computer device may determine that the target cutting model satisfies the cutting end condition.

In some embodiments, the cutting end condition may also include a number-of-cuts threshold (e.g. 5). Based on this, the computer device may record the number of cuts that have been performed when obtaining the target cutting model during the collision simulation of the initial cutting model. If the number of cuts does not reach the number-of-cuts threshold, the computer device may determine that the target cutting model does not satisfy the cutting end condition. At this moment, the computer device needs to continue cutting the target cutting model not satisfying the cutting end condition. If the number of cuts reaches the number-of-cuts threshold, the computer device may determine that the target cutting model satisfies the cutting end condition.

The computer device may take the target cutting model satisfying the cutting end condition as a target model, and may then determine a target rigid body corresponding to the target model based on the physical engine and target model information of the target model. The specific implementation of the computer device determining a target rigid body corresponding to the target model may be seen from the above specific implementation of determining the first rigid body corresponding to the first model, and details are not described herein again.

Further, the computer device may acquire a physical attribute of the target rigid body, so as to control the target model to execute a physical motion based on the physical attribute of the target rigid body. Meanwhile, the computer device may acquire an animation image frame during the execution of the physical motion, and may then obtain the cutting data for presentation on the mobile terminal based on the animation image frame. It is to be understood that when a certain game user performs a certain trigger operation (e.g. a screen sliding operation) in a game so that a first model and a second model in the game collide, the computer device may output cutting data corresponding to this trigger operation to a mobile terminal (e.g. any one of the user terminals in the user terminal cluster shown in FIG. 1, e.g. user terminal 100*a*) used by the game user, so that the mobile terminal displays a collision effect between the models based on the cutting data.

Figure 8:
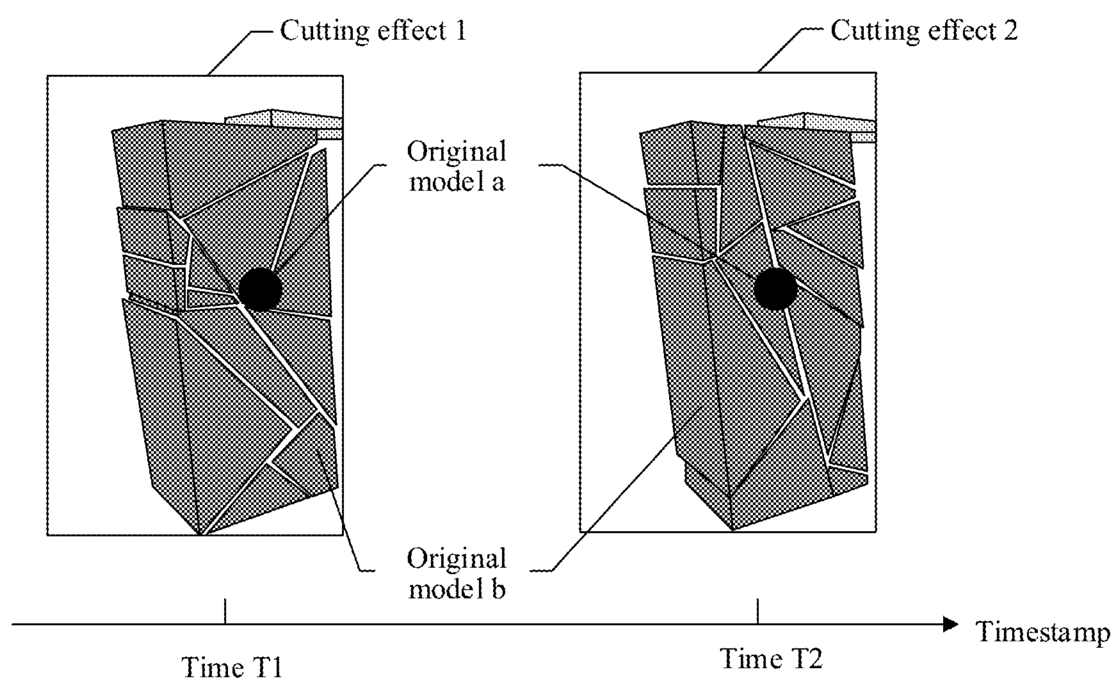
FIG. 8 is a diagram comparing different cutting effects generated at the same collision point according to some embodiments.

FIG. 8 is a diagram comparing different cutting effects generated at the same collision point according to some embodiments. As shown in FIG. 8, original model a in some embodiments may be a first model corresponding to a first rigid body, and original model b may be a second model corresponding to a second rigid body. Original model a may be an iron ball in a game, and original model b may be a hit building (e.g. a pillar) in the game.

As shown in FIG. 8, a physical engine in a computer device may determine original model b as an initial cutting model upon detecting that the first rigid body bound to original model a collides with the second rigid body bound to original model b. In order to effectively ensure the visual experience of a user, in the process of cutting original model b, a cutting surface in each cutting is obtained by rotating a surface-to-be-cut according to a random angle. Cutting effect 1 shown in FIG. 8 may be a cutting effect obtained when the computer device detects that the first rigid body and the second rigid body collide at a certain collision point at time T1 (i.e. a first time), and cuts the initial cutting model. Cutting effect 2 shown in FIG. 8 may be a cutting effect obtained when the computer device detects that the first rigid body and the second rigid body collide at the same collision point at time T2 (i.e. a second time), and cuts the initial cutting model. The first time and the second time may refer to two different times detected by the computer device when two rigid bodies collide at the same collision point.

In some embodiments, the simulation effect of breaking an original model on a mobile device such as a mobile phone may be simulated. A physical engine introduced by a computer device having a collision simulation function can acquire physical attributes of rigid bodies in real time. One rigid body corresponds to one original model. The first model and the second model in some embodiments are both independent original models, rather than models built by multiple independent models. Therefore, in the process of collision simulation, the physical engine may directly perform collision detection on the first rigid body bound to the first model and the second rigid body bound to the second model, without performing multiple collision detections on the first model and the second model, whereby the number of collision detections can be effectively reduced, thereby reducing the computation amount of the computer device and improving the fluency of collision simulation. Furthermore, manual participation in model building is not required in the creation process of the original models, a design user is no longer responsible for the related design work of model fragmentation, and the difficulty of coding by a program development user is also reduced. Therefore, in the entire process of collision simulation, the labor cost can be reduced, and time consumed for model building can also be saved, so as to improve the efficiency of collision simulation.

Figure 9:
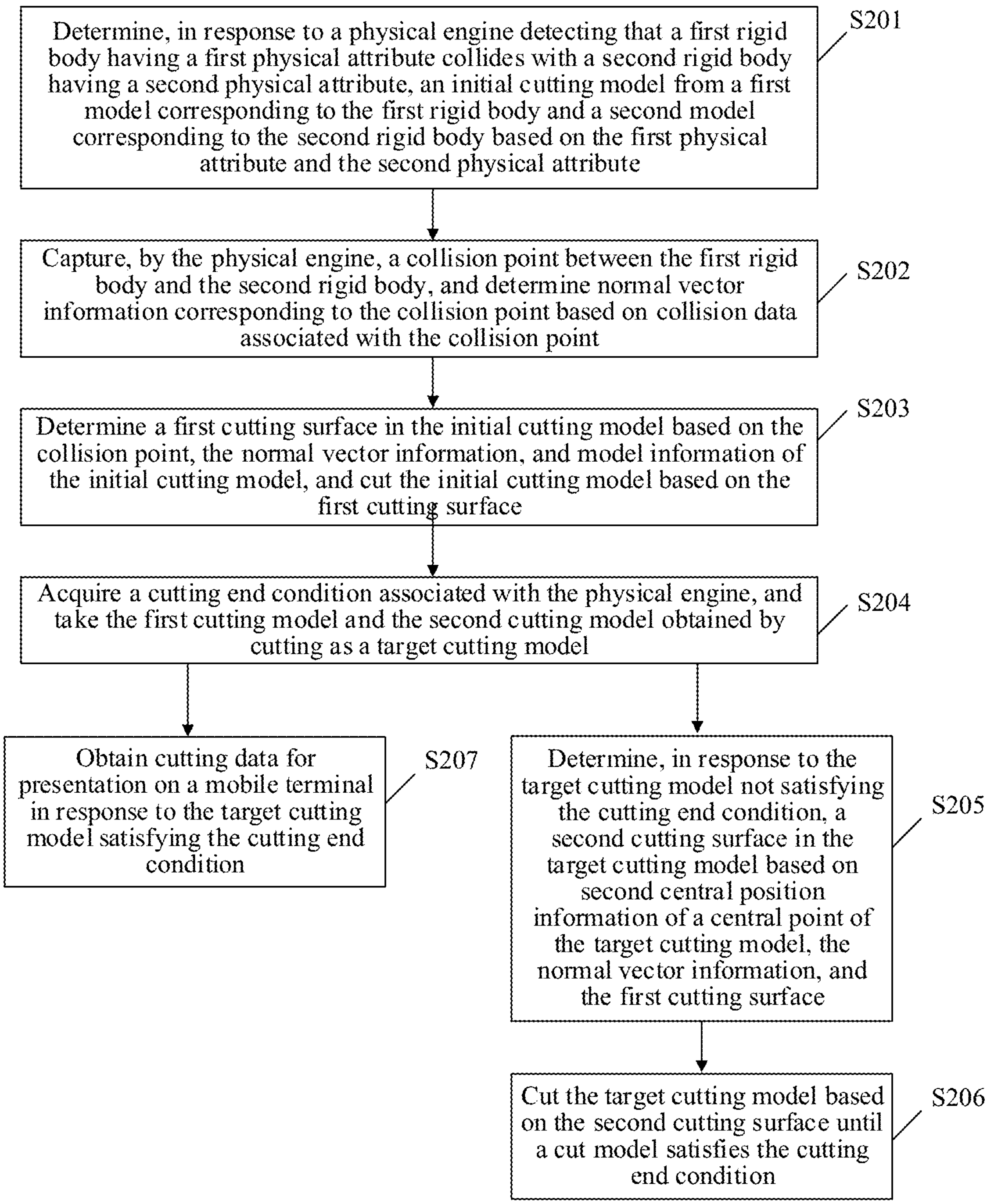
FIG. 9 is a schematic flowchart of a collision data processing method according to some embodiments.

FIG. 9 is a schematic flowchart of a collision data processing method according to some embodiments. As shown in FIG. 9, the method may be performed by a computer device having a collision simulation function. The computer device may be a user terminal (e.g. user terminal 100*a* shown in FIG. 1) or a server (e.g. the server 10 shown in FIG. 1). This is not limited herein. For convenience of understanding, some embodiments are illustrated with an example where the method is performed by a server. The method may include at least the following operations S201-S207:

Operation S201: Determine, in response to a physical engine detecting that a first rigid body having a first physical attribute collides with a second rigid body having a second physical attribute, an initial cutting model from a first model corresponding to the first rigid body and a second model corresponding to the second rigid body based on the first physical attribute and the second physical attribute.

Operation S202: Capture, by the physical engine, a collision point between the first rigid body and the second rigid body, and determine normal vector information corresponding to the collision point based on collision data associated with the collision point.

Operation S203: Determine a first cutting surface in the initial cutting model based on the collision point, the normal vector information, and model information of the initial cutting model, and cut the initial cutting model based on the first cutting surface.

For the specific embodiments of operation S201 to operation S203, reference may be made to the description about operation S101 to operation S103 in the embodiment corresponding to FIG. 3, and details are not described herein again.

Operation S204: Acquire a cutting end condition associated with the physical engine, and take the first cutting model and the second cutting model obtained by cutting as a target cutting model.

Operation S205: Determine, in response to the target cutting model not satisfying the cutting end condition, a second cutting surface in the target cutting model based on second central position information of a central point of the target cutting model, the normal vector information, and the first cutting surface.

Specifically, the computer device may determine, in response to the target cutting model not satisfying the cutting end condition, second central position information of a central point of the target cutting model in the space coordinate system, and may then take a central point corresponding to the second central position information as a first key point. Furthermore, the computer device may also acquire a normal vector direction and a normal vector length in the normal vector information, and may then take, along the normal vector direction, a coordinate point corresponding to position information at a distance from the second central position information by the normal vector length as a second key point. Furthermore, the computer device may also acquire a second angle (e.g. $\pi/4$) for rotating the first cutting surface based on an angle interval associated with the physical engine, rotate the first cutting surface based on the collision point, the normal vector information, and the second angle to obtain a rotated first cutting surface, determine a target intersection point having a minimum distance between the rotated first cutting surface and the target cutting model, and position information of the target intersection point, and then take the target intersection point as a third key point. The computer device may then construct a second surface-to-be-cut in the target cutting model based on the first key point, the second key point, and the third key point, and determine a second cutting surface in the target cutting model based on the second surface-to-be-cut.

The specific implementation of the computer device determining a second cutting surface may be seen from the above specific implementation of the computer device determining a first cutting surface, and details are not described herein again.

Operation S206: Cut the target cutting model based on the second cutting surface until a cut model satisfies the cutting end condition.

Specifically, the computer device may re-cut the target cutting model based on the second cutting surface, so as to obtain a re-cut model. When the re-cut model does not satisfy the cutting end condition, the computer device may take the re-cut model as a new target cutting model, and may then cut the new target cutting model until a target cutting model satisfying the cutting end condition is obtained.

Operation S207: Obtain cutting data for presentation on a mobile terminal in response to the target cutting model satisfying the cutting end condition.

Figure 10:
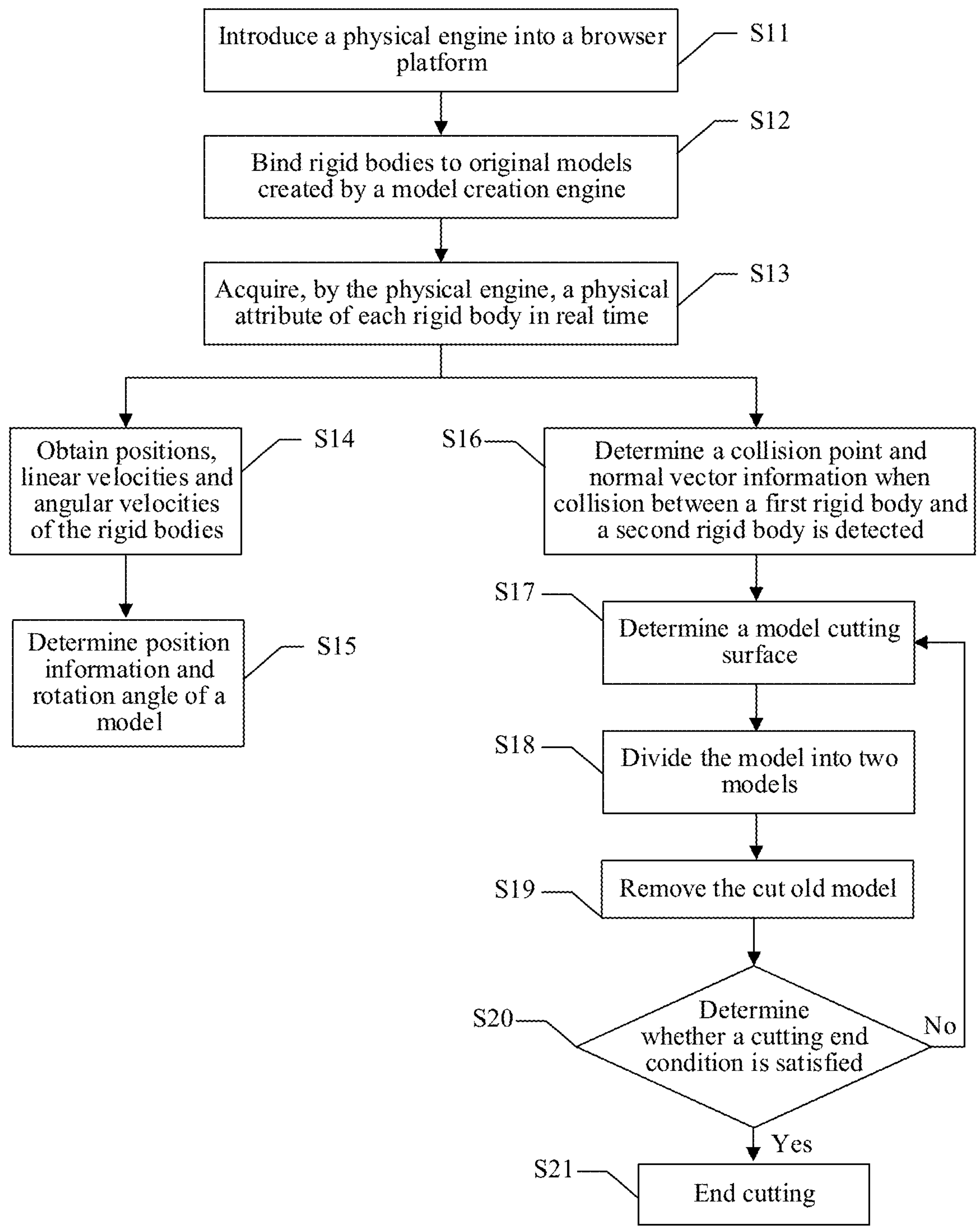
FIG. 10 is a flowchart of collision data processing according to some embodiments.

FIG. 10 is a flowchart of collision data processing according to some embodiments. A computer device in some embodiments may be a computer device having a collision simulation function. The computer device may be the server 10 shown in FIG. 1.

It is to be understood that the computer device needs to perform operation S11 when simulating a collision simulation effect so as to introduce a physical engine into a browser platform, and may then perform operation S12 to bind a corresponding rigid body to each original model based on model information of original models created by a model creation engine associated with the browser platform, and one original model corresponds to one rigid body. Further, the computer device may perform operation S13 to refresh an animation image frame in the browser platform so as to acquire a physical attribute of each rigid body in real time, and may then perform operation S14 to acquire attribute information such as the position, linear velocity and angular velocity of each rigid body from the physical attribute of each rigid body. At this moment, the computer device may assign relevant attribute information (e.g. position information and rotation angle, etc.) in the physical attribute of each rigid body to the original model bound therewith through the physical engine, so as to control the original model to perform a corresponding physical motion. Further, the computer device may perform operation S15 to update the position information and rotation angle, etc. of the original model bound therewith by using the physical attribute of the rigid body before each WebGL screen rendering.

When the physical engine detects that a first rigid body and a second rigid body in the computer device collide, the computer device may determine an initial cutting model based on physical attributes of the two rigid bodies, and may then perform operation S16 to determine a collision point between the first rigid body and the second rigid body and to determine normal vector information corresponding to the collision point based on collision data (e.g. a collision impulse and an impulse direction) associated with the collision point. Further, the computer device may perform operation S17 to determine a cutting surface (i.e. a first cutting surface) of the initial cutting model, and may then perform operation S18 to divide, based on the first cutting surface, the initial cutting model into two models and to construct two brand-new sub-models (for example, a first cutting model and a second cutting model) by using cutting position information of a cutting point of the initial cutting model and vertex position information of a vertex of the initial cutting model. Meanwhile, the computer device may also perform operation S18 to remove the cut old model (i.e. the initial cutting model).

The computer device may also acquire a cutting end condition associated with the physical engine and take the first cutting model and the second cutting model as a target cutting model, and may then perform operation S20 to determine whether the target cutting model satisfies the cutting end condition. When a model size of the target cutting model is less than or equal to a model size threshold in the cutting end condition (or the number of cuts reaches a number-of-cuts threshold in the cutting end condition), the computer device may determine that the target cutting model satisfies the cutting end condition. At this moment, the computer device may perform operation S21 to end this cut.

When the model size of the target cutting model is greater than the model size threshold in the cutting end condition (or the number of cuts does not reach the number-of-cuts threshold in the cutting end condition), the computer device may determine that the target cutting model does not satisfy the cutting end condition. At this moment, the computer device may re-perform operation S17 to determine a cutting surface (i.e. a second cutting surface) in the target cutting model not satisfying the cutting end condition, and may then perform operations S18-S19 to cut the target cutting model until the cut model satisfies the cutting end condition. The computer device may perform operation S21 to end this cut.

In some embodiments, a physical engine introduced by a computer device having a collision simulation function can acquire physical attributes of rigid bodies in real time. One rigid body corresponds to one original model. When the physical engine detects that a first rigid body having a first physical attribute collides with a second rigid body having a second physical attribute, the computer device may determine an initial cutting model from a first model corresponding to the first rigid body and a second model corresponding to the second rigid body based on the first physical attribute and the second physical attribute, determine a collision point at which the first rigid body collides with the second rigid body, and normal vector information corresponding to the collision point based on the physical engine so as to determine a first cutting surface in the initial cutting model, and then cut the initial cutting model based on the first cutting surface to obtain cutting data for presentation on a mobile terminal, thereby simulating a simulation effect of breaking the initial cutting model into fragments. The first model and the second model in some embodiments are both independent original models, rather than models built by multiple independent models. Therefore, in the process of collision simulation, the physical engine may directly perform collision detection on the first rigid body bound to the first model and the second rigid body bound to the second model, without performing multiple collision detections on the first model and the second model, whereby the number of collision detections can be effectively reduced, thereby reducing the computation amount of the computer device and improving the fluency of collision simulation. Furthermore, manual participation in model building is not required in the creation process of the original models. Therefore, in the entire process of collision simulation, the labor cost can be reduced, and time consumed for model building can also be saved, so as to improve the efficiency of collision simulation.

Figure 11:
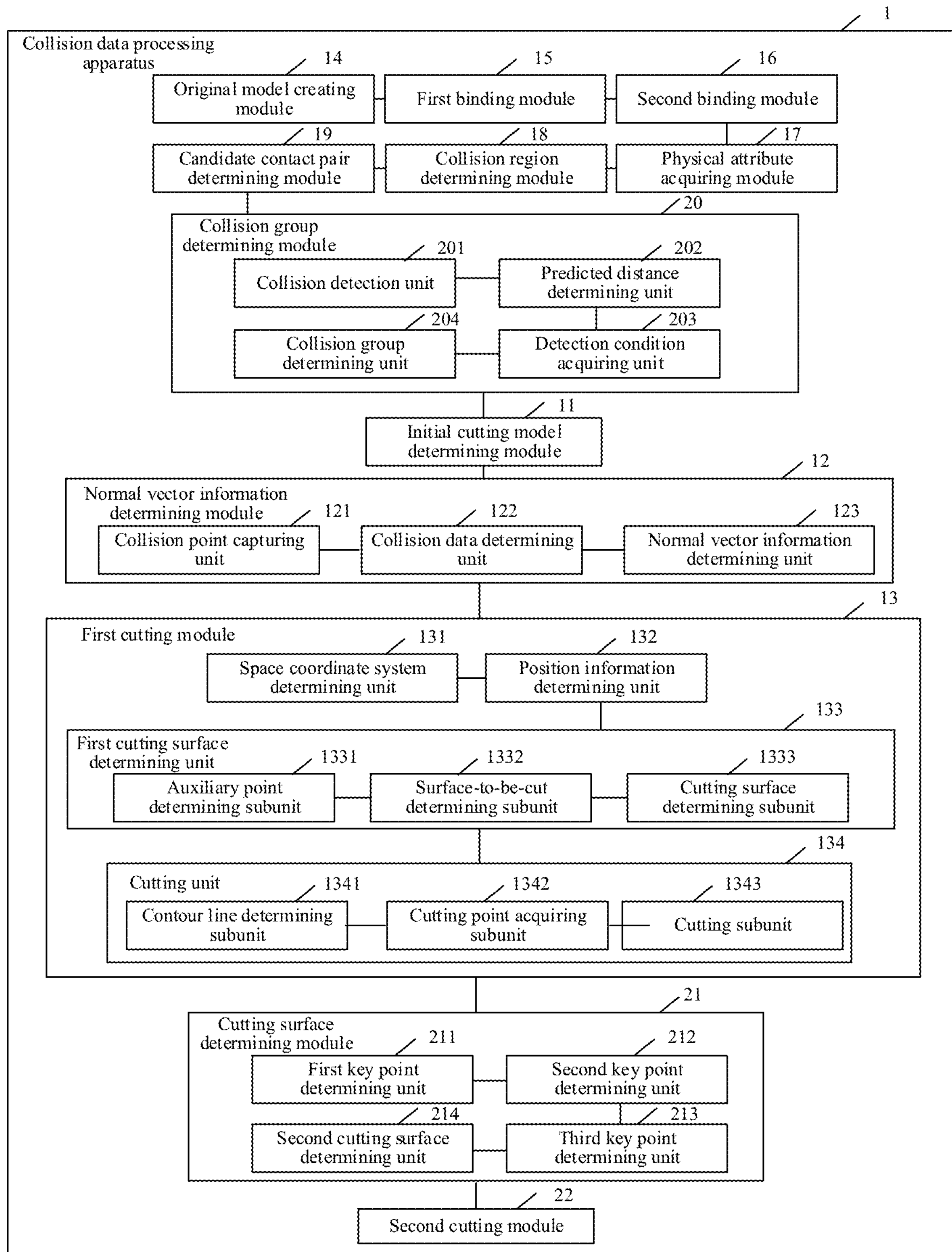
FIG. 11 is a schematic structural diagram of a collision data processing apparatus according to some embodiments.

FIG. 11 is a schematic structural diagram of a collision data processing apparatus according to some embodiments. As shown in FIG. 11, the collision data processing apparatus 1 may be a computer program (including a program code) operated in a computer device. For example, the collision data processing apparatus 1 is application software. The collision data processing apparatus 1 may be configured to perform the corresponding operations in the method provided by some embodiments. As shown in FIG. 11, the collision data processing apparatus 1 may be operated on a computer device having a collision simulation function. The computer device may be the server 10 in the embodiment corresponding to FIG. 1. The collision data processing apparatus 1 may include: an initial cutting model determining module 11, a normal vector information determining module 12, a first cutting module 13, an original model creating module 14, a first binding module 15, a second binding module 16, a physical attribute acquiring module 17, a collision region determining module 18, a candidate contact pair determining module 19, a collision group determining module 20, a cutting surface determining module 21, and a second cutting module 22.

The initial cutting model determining module 11 is configured to determine, in response to a physical engine detecting that a first rigid body having a first physical attribute collides with a second rigid body having a second physical attribute, an initial cutting model from a first model corresponding to the first rigid body and a second model corresponding to the second rigid body based on the first physical attribute and the second physical attribute.

The normal vector information determining module 12 is configured to capture, by the physical engine, a collision point between the first rigid body and the second rigid body, and determine normal vector information corresponding to the collision point based on collision data associated with the collision point.

The normal vector information determining module 12 includes: a collision point capturing unit 121, a collision data determining unit 122, and a normal vector information determining unit 123.

The collision point capturing unit 121 is configured to capture, by the physical engine, a collision point at which the first rigid body collides with the second rigid body in a model coordinate system where the initial cutting model is located.

The collision data determining unit 122 is configured to acquire, by the physical engine, a collision impulse generated in response to the first rigid body colliding with the second rigid body, and an impulse direction of the collision impulse, determine a normal vector length of a normal vector associated with the collision point according to the collision impulse, and determine a normal vector direction of the normal vector according to the impulse direction.

The normal vector information determining unit 123 is configured to determine normal vector information corresponding to the collision point based on the normal vector direction and the normal vector length.

For the specific implementation of the collision point capturing unit 121, the collision data determining unit 122, and the normal vector information determining unit 123, reference may be made to the description about operation S102 in the embodiment corresponding to FIG. 3, and details are not described herein again.

The first cutting module 13 is configured to determine a first cutting surface in the initial cutting model based on the collision point, the normal vector information, and model information of the initial cutting model, and cut the initial cutting model based on the first cutting surface to obtain cutting data for presentation on a mobile terminal. The cutting data is used for representing a collision effect between the first model and the second model.

The first cutting module 13 includes: a space coordinate system determining unit 131, a position information determining unit 132, a first cutting surface determining unit 133, and a cutting unit 134.

The space coordinate system determining unit 131 is configured to determine a space coordinate system with a central point of the initial cutting model as a coordinate origin in a model coordinate system where the initial cutting model is located.

The position information determining unit 132 is configured to determine first central position information of the central point of the initial cutting model in the space coordinate system based on relative coordinate conversion information between the model coordinate system and the space coordinate system, and determine collision position information of the collision point in the space coordinate system.

The first cutting surface determining unit 133 is configured to determine the first cutting surface in the initial cutting model based on the first central position information, the collision position information, and the normal vector information.

The normal vector information includes a normal vector length and a normal vector direction of a normal vector associated with the collision point. The normal vector length is determined based on a collision impulse generated in response to the first rigid body colliding with the second rigid body. The normal vector direction is an impulse direction of the impact impulse.

The first cutting surface determining unit 133 includes: an auxiliary point determining subunit 1331, a surface-to-be-cut determining subunit 1332, and a cutting surface determining subunit 1333.

The auxiliary point determining subunit 1331 is configured to determine a central point corresponding to the first central position information as a first auxiliary point, determine the collision point corresponding to the collision position information as a second auxiliary point, and take, along the normal vector direction, a coordinate point corresponding to position information at a distance from the collision position information by the normal vector length as a third auxiliary point.

The surface-to-be-cut determining subunit 1332 is configured to determine a first surface-to-be-cut in the initial cutting model based on the first auxiliary point, the second auxiliary point, and the third auxiliary point.

The cutting surface determining subunit 1333 is configured to acquire a first angle for rotating the first surface-to-be-cut based on an angle interval associated with the physical engine, rotate the first surface-to-be-cut according to the first angle by taking the normal vector as a rotation axis and taking the collision point as a rotation point, and take the rotated first surface-to-be-cut as the first cutting surface.

For the specific implementation of the auxiliary point determining subunit 1331, the surface-to-be-cut determining subunit 1332, and the cutting surface determining subunit 1333, reference may be made to the description about the first cutting surface in the embodiment corresponding to FIG. 3, and details are not described herein again.

The cutting unit 134 is configured to cut the initial cutting model based on the first cutting surface to obtain cutting data for presentation on a mobile terminal.

The cutting unit 134 includes: a contour line determining subunit 1341, a cutting point acquiring subunit 1342, and a cutting subunit 1343.

The contour line determining subunit 1341 is configured to acquire vertex position information of a vertex of the initial cutting model based on the model information of the initial cutting model, and determine a contour line of the initial cutting model based on the vertex position information.

The cutting point acquiring subunit 1342 is configured to acquire a cutting point between the contour line and the first cutting surface, and determine cutting position information of the cutting point in the space coordinate system.

The cutting subunit 1343 is configured to cut the initial cutting model into a first cutting model and a second cutting model based on the cutting position information and the vertex position information, and obtain cutting data for presentation on the mobile terminal based on the first cutting model and the second cutting model.

The cutting subunit 1343 is further configured to:

determine, by a model creation engine, a geometric material of the initial cutting model from the model information of the initial cutting model;

determine a first coordinate array for constructing the first cutting model and a second coordinate array for constructing the second cutting model based on the cutting position information and the vertex position information, the first cutting model and the second cutting model being obtained by cutting the initial cutting model;

create a first geometric structure of the first cutting model by using the first coordinate array, and create a second geometric structure of the second cutting model by using the second coordinate array;

create the first cutting model based on the first geometric structure and the geometric material, create the second cutting model based on the second geometric structure and the geometric material, and determine the first cutting model and the second cutting model as a target cutting model; and acquire a cutting end condition associated with the physical engine, and obtain cutting data for presentation on a mobile terminal in response to the target cutting model satisfying the cutting end condition.

The cutting subunit 1343 is further configured to:

acquire a cutting end condition associated with the physical engine, the cutting end condition including a model size threshold;

acquire a model size of the target cutting model, and in response to the model size of the target cutting model being less than or equal to the model size threshold, determine that the target cutting model satisfies the cutting end condition, and take the target cutting model satisfying the cutting end condition as a target model;

determine a target rigid body corresponding to the target model based on the physical engine and target model information of the target model; and acquire a physical attribute of the target rigid body, control the target model to execute a physical motion based on the physical attribute of the target rigid body, acquire an animation image frame during the execution of the physical motion, and obtain the cutting data for presentation on the mobile terminal based on the animation image frame.

For the specific implementation of the contour line determining subunit 1341, the cutting point acquiring subunit 1342, and the cutting subunit 1343, reference may be made to the description about cutting of the initial cutting model in the embodiment corresponding to FIG. 3, and details are not described herein again.

For the specific implementation of the space coordinate system determining unit 131, the position information determining unit 132, the first cutting surface determining unit 133, and the cutting unit 134, reference may be made to the description about operation S103 in the embodiment corresponding to FIG. 3, and details are not described herein again.

The original model creating module 14 is configured to start a model creation engine associated with a browser platform, and create N original models through the model creation engine. The N original models include the first model and the second model. N is an integer greater than or equal to 2.

The first binding module 15 is configured to determine first model information of the first model based on the physical engine, determine first rigid body information of the first rigid body including the first model according to the first model information, create the first rigid body to be bound with the first model based on the first rigid body information, and bind the first rigid body with a first variable parameter in the first model. The first variable parameter is used for instructing the physical engine to determine the first rigid body corresponding to the first model.

The second binding module 16 is configured to determine second model information of the second model based on the physical engine, determine second rigid body information of the second rigid body including the second model according to the second model information, create the second rigid body to be bound with the second model based on the second rigid body information, and bind the second rigid body with a second variable parameter in the second model. The second variable parameter is used for instructing the physical engine to determine the second rigid body corresponding to the second model.

One original model corresponds to one rigid body.

The physical attribute acquiring module 17 is configured to acquire physical attributes of N rigid bodies corresponding to the N original models based on the physical engine; and determine a reference collision rigid body from the N rigid bodies, and take rigid bodies other than the reference collision rigid body in the N rigid bodies as candidate collision rigid bodies.

The collision region determining module 18 is configured to determine a collision region associated with the reference collision rigid body based on a physical attribute of the reference collision rigid body and a collision distance threshold corresponding to the physical engine.

The candidate contact pair determining module 19 is configured to determine, in the presence of a candidate collision rigid body, falling into the collision region, among the candidate collision rigid bodies, the candidate collision rigid body falling into the collision region as a target collision rigid body, and form candidate contact pairs by the target collision rigid body and the reference collision rigid body.

The collision group determining module 20 is configured to acquire a collision detection condition, perform collision detection on the candidate contact pairs based on the collision detection condition, screen a candidate contact pair satisfying the collision detection condition from the respective candidate contact pairs, and take the screened candidate contact pair as a collision group. The reference collision rigid body in the collision group is the first rigid body. The target collision rigid body in the collision group is the second rigid body.

The collision group determining module 20 includes: a collision detection unit 201, a predicted distance determining unit 202, a detection condition acquiring unit 203, and a collision group determining unit 204.

The collision detection unit 201 is configured to perform collision detection on the target collision rigid body and the reference collision rigid body in the candidate contact pairs based on a physical attribute of the target collision rigid body in the candidate contact pairs and the physical attribute of the reference collision rigid body in the candidate contact pairs.

The predicted distance determining unit 202 is configured to determine a first predicted contact point in the target collision rigid body, determine a second predicted contact point corresponding to the first predicted contact point in the reference collision rigid body, and determine a predicted distance between the first predicted contact point and the second predicted contact point through the physical engine.

The detection condition acquiring unit 203 is configured to acquire a collision detection condition. The collision detection condition is used for screening candidate contact pairs having non-positive predicted distances.

The collision group determining unit 204 is configured to screen a candidate contact pair satisfying the collision detection condition as the collision group from the respective candidate contact pairs.

For the specific implementation of the collision detection unit 201, the predicted distance determining unit 202, the detection condition acquiring unit 203, and the collision group determining unit 204, reference may be made to the description about the collision group in the embodiment corresponding to FIG. 5, and details are not described herein again.

The cutting surface determining module 21 is configured to determine, based on the target cutting model not satisfying the cutting end condition, a second cutting surface in the target cutting model based on second central position information of a central point of the target cutting model, the normal vector information, and the first cutting surface.

The cutting surface determining module 21 includes: a first key point determining unit 211, a second key point determining unit 212, a third key point determining unit 213, and a second cutting surface determining unit 214.

The first key point determining unit 211 is configured to determine, based on the target cutting model not satisfying the cutting end condition, second central position information of a central point of the target cutting model in the space coordinate system, and take a central point corresponding to the second central position information as a first key point.

The second key point determining unit 212 is configured to acquire a normal vector direction and a normal vector length in the normal vector information, and take, along the normal vector direction, a coordinate point corresponding to position information at a distance from the second central position information by the normal vector length as a second key point.

The third key point determining unit 213 is configured to acquire a second angle for rotating the first cutting surface based on an angle interval associated with the physical engine, rotate the first cutting surface based on the collision point, the normal vector information, and the second angle to obtain a rotated first cutting surface, determine a target intersection point having a minimum distance between the rotated first cutting surface and the target cutting model, and position information of the target intersection point, and take the target intersection point as a third key point.

The second cutting surface determining unit 214 is configured to construct a second surface-to-be-cut in the target cutting model based on the first key point, the second key point, and the third key point, and determine a second cutting surface in the target cutting model based on the second surface-to-be-cut.

For the specific implementation of the first key point determining unit 211, the second key point determining unit 212, the third key point determining unit 213, and the second cutting surface determining unit 214, reference may be made to the description about S205 in the embodiment corresponding to FIG. 9, and details are not described herein again.

The second cutting module 22 is configured to cut the target cutting model based on the second cutting surface until a cut model satisfies the cutting end condition.

For the specific implementation of the initial cutting model determining module 11, the normal vector information determining module 12, the first cutting module 13, the original model creating module 14, the first binding module 15, the second binding module 16, the physical attribute acquiring module 17, the collision region determining module 18, the candidate contact pair determining module 19, the collision group determining module 20, the cutting surface determining module 21, and the second cutting module 22, reference may be made to the description about operations S201-S207 in the embodiment corresponding to FIG. 9, and details are not described herein again. In addition, the description of beneficial effects of the same method is not described herein again.

Figure 12:
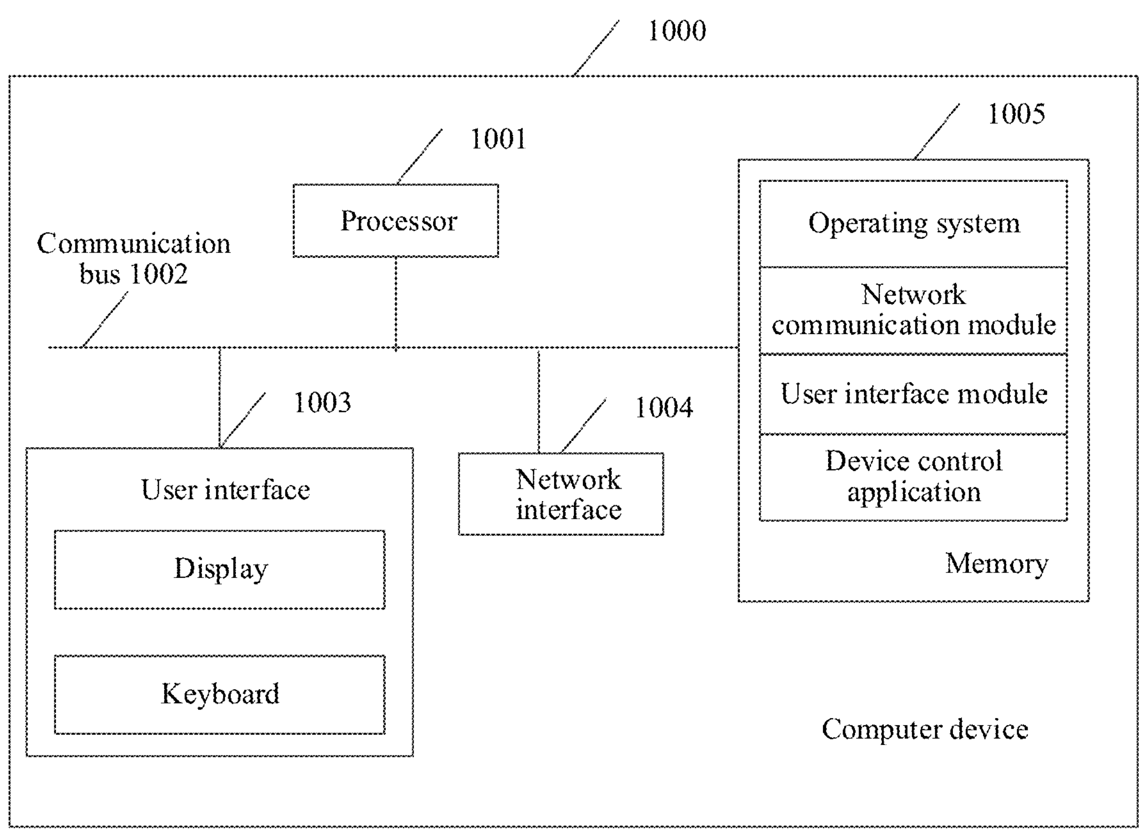
FIG. 12 is a schematic diagram of a computer device according to some embodiments.

FIG. 12 is a schematic diagram of a computer device according to some embodiments. As shown in FIG. 12, the computer device 1000 may be a server 10 in the embodiment corresponding to FIG. 1. The computer device 1000 may include: at least one processor 1001, such as a CPU, at least one network interface 1004, a user interface 1003, a memory 1005, and at least one communication bus 1002. The communication bus 1002 is configured to implement connection and communication between the components. The user interface 1003 may include a display, a keyboard, and the network interface 1004 may include a standard wired interface and a standard wireless interface (for example, a Wi-Fi interface). The memory 1005 may be a high-speed RAM memory, or may be a non-volatile memory, for example, at least one magnetic disk memory. In some embodiments, the memory 1005 may further be at least one storage apparatus away from the foregoing processor 1001. As shown in FIG. 12, the memory 1005 used as a computer storage medium may include an operating system, a network communication module, a user interface module, and a device-control application program.

In the computer device 1000 shown in FIG. 12, the network interface 1004 is mainly configured to perform network communication. The user interface 1003 is mainly configured to provide an input interface for a user. The processor 1001 may be configured to call the device control application program stored in the memory 1005 to implement the foregoing described method embodiments.

It is to be understood that the computer device 1000 described in some embodiments can implement the descriptions of the collision data processing method in the foregoing embodiment corresponding to FIG. 3 and FIG. 9, and can also implement the descriptions of the collision data processing apparatus 1 in the foregoing embodiment corresponding to FIG. 11. Details are not described herein again. In addition, the description of beneficial effects of the same method is not described herein again.

Some embodiments further provide a computer-readable storage medium, the computer-readable storage medium storing a computer program, the computer program including program instructions, the program instructions, when executed by a processor, performing the data transmission method provided by each operation in FIG. 3 and FIG. 9. For a specific implementation, refer to the operations in FIG. 3 and FIG. 9. Details are not described herein again.

The computer-readable storage medium may be a data transmission apparatus provided in any one of the foregoing embodiments or an internal storage unit of the computer device, for example, a hard disk or a main memory of the computer device. The computer-readable storage medium may alternatively be an external storage device of the computer device, for example, a removable hard disk, a smart memory card (SMC), a secure digital (SD) card, or a flash card equipped on the computer device. Further, the computer-readable storage medium may further comprise both an internal storage unit and an external storage device of the computer device. The computer-readable storage medium is configured to store the computer program and another program and data that are required by the computer device. The computer-readable storage medium may further be configured to temporarily store data that has been output or data to be output.

Some embodiments may provide a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to perform the descriptions of the collision data processing method in the embodiment corresponding to FIG. 3 or FIG. 9. Details are not described herein again. In addition, the description of beneficial effects of the same method is not described herein again.

A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A collision data processing method, performed by a computer device, the collision data processing method comprising:

determining, based on a physical engine detecting that a first rigid body having a first physical attribute collides with a second rigid body having a second physical attribute, an initial cutting model from a first model corresponding to the first rigid body and a second model corresponding to the second rigid body based on the first physical attribute and the second physical attribute;

capturing, by the physical engine, a collision point between the first rigid body and the second rigid body, and determining normal vector information corresponding to the collision point based on collision data associated with the collision point; and determining a first cutting surface in the initial cutting model based on the collision point, the normal vector information, and model information of the initial cutting model, and cutting the initial cutting model based on the first cutting surface to obtain cutting data for presentation on a mobile terminal, the cutting data representing a collision effect between the first model and the second model.

2. The collision data processing method according to claim 1, further comprising:

starting a model creation engine, and creating N original models through the model creation engine, the N original models comprising the first model and the second model, and N being an integer greater than or equal to 2;

determining first model information of the first model based on the physical engine, determining first rigid body information of the first rigid body comprising the first model according to the first model information, creating the first rigid body to be bound with the first model based on the first rigid body information, and binding the first rigid body with a first variable parameter in the first model, the first variable parameter instructing the physical engine to determine the first rigid body corresponding to the first model; and determining second model information of the second model based on the physical engine, determining second rigid body information of the second rigid body comprising the second model according to the second model information, creating the second rigid body to be bound with the second model based on the second rigid body information, and binding the second rigid body with a second variable parameter in the second model, the second variable parameter instructing the physical engine to determine the second rigid body corresponding to the second model.

3. The collision data processing method according to claim 2, further comprising:

acquiring physical attributes of N rigid bodies corresponding to the N original models based on the physical engine; determining a reference collision rigid body from the N rigid bodies, and taking rigid bodies other than the reference collision rigid body in the N rigid bodies as candidate collision rigid bodies;

determining a collision region associated with the reference collision rigid body based on a physical attribute of the reference collision rigid body and a collision distance threshold corresponding to the physical engine;

determining, in a presence of a candidate collision rigid body, falling into the collision region, among the candidate collision rigid bodies, the candidate collision rigid body falling into the collision region as a target collision rigid body, and forming candidate contact pairs by the target collision rigid body and the reference collision rigid body; and acquiring a collision detection condition, performing collision detection on the candidate contact pairs based on the collision detection condition, screening a candidate contact pair satisfying the collision detection condition from the respective candidate contact pairs, and taking the screened candidate contact pair as a collision group, the reference collision rigid body in the collision group being the first rigid body, and the target collision rigid body in the collision group being the second rigid body.

4. The collision data processing method according to claim 3, wherein the acquiring the collision detection condition comprises:

performing collision detection on the target collision rigid body and the reference collision rigid body in the candidate contact pairs based on a physical attribute of the target collision rigid body in the candidate contact pairs and the physical attribute of the reference collision rigid body in the candidate contact pairs;

determining a first predicted contact point in the target collision rigid body, determining a second predicted contact point corresponding to the first predicted contact point in the reference collision rigid body, and determining a predicted distance between the first predicted contact point and the second predicted contact point through the physical engine;

acquiring the collision detection condition, the collision detection condition screening the candidate contact pairs having non-positive predicted distances; and screening the candidate contact pair satisfying the collision detection condition as the collision group from the respective candidate contact pairs.

5. The collision data processing method according to claim 1, wherein the capturing comprises:

capturing, by the physical engine, the collision point at which the first rigid body collides with the second rigid body in a model coordinate system where the initial cutting model is located;

acquiring, by the physical engine, a collision impulse generated based on the first rigid body colliding with the second rigid body, and an impulse direction of the collision impulse, and taking the collision impulse and the impulse direction as collision data associated with the collision point;

determining a normal vector length of a normal vector associated with the collision point according to the collision impulse, and determining a normal vector direction of the normal vector according to the impulse direction; and determining the normal vector information corresponding to the collision point based on the normal vector direction and the normal vector length.

6. The collision data processing method according to claim 1, wherein the determining the first cutting surface in the initial cutting model comprises:

determining a space coordinate system with a central point of the initial cutting model as a coordinate origin in a model coordinate system where the initial cutting model is located;

determining first central position information of the central point of the initial cutting model in the space coordinate system based on relative coordinate conversion information between the model coordinate system and the space coordinate system, and determining collision position information of the collision point in the space coordinate system;

determining the first cutting surface in the initial cutting model based on the first central position information, the collision position information, and the normal vector information; and cutting the initial cutting model based on the first cutting surface to obtain the cutting data.

7. The collision data processing method according to claim 6, wherein the normal vector information comprises a normal vector length and a normal vector direction of a normal vector associated with the collision point; the normal vector length is determined based on a collision impulse generated based on the first rigid body colliding with the second rigid body; the normal vector direction is an impulse direction of an impact impulse;

the determining the first cutting surface in the initial cutting model comprises:

determining a central point corresponding to the first central position information as a first auxiliary point, determining the collision point corresponding to the collision position information as a second auxiliary point, and taking, along the normal vector direction, a coordinate point corresponding to position information at a distance from the collision position information by the normal vector length as a third auxiliary point;

determining a first surface-to-be-cut in the initial cutting model based on the first auxiliary point, the second auxiliary point, and the third auxiliary point; and acquiring a first angle for rotating the first surface-to-be-cut based on an angle interval associated with the physical engine, rotating the first surface-to-be-cut according to the first angle by taking the normal vector as a rotation axis and taking the collision point as a rotation point, and taking the rotated first surface-to-be-cut as the first cutting surface.

8. The collision data processing method according to claim 6, wherein the cutting the initial cutting model comprises:

acquiring vertex position information of a vertex of the initial cutting model based on the model information of the initial cutting model, and determining a contour line of the initial cutting model based on the vertex position information;

acquiring a cutting point between the contour line and the first cutting surface, and determining cutting position information of the cutting point in the space coordinate system; and cutting the initial cutting model into a first cutting model and a second cutting model based on the cutting position information and the vertex position information, and obtaining the cutting data based on the first cutting model and the second cutting model.

9. The collision data processing method according to claim 8, wherein the cutting the initial cutting model into the first cutting model and the second cutting model comprises:

determining, by a model creation engine, a geometric material of the initial cutting model from the model information of the initial cutting model;

determining a first coordinate array for constructing the first cutting model and a second coordinate array for constructing the second cutting model based on the cutting position information and the vertex position information, the first cutting model and the second cutting model being obtained by cutting the initial cutting model;

creating a first geometric structure of the first cutting model by using the first coordinate array, and creating a second geometric structure of the second cutting model by using the second coordinate array;

creating the first cutting model based on the first geometric structure and the geometric material, creating the second cutting model based on the second geometric structure and the geometric material, and determining the first cutting model and the second cutting model as a target cutting model; and acquiring a cutting end condition associated with the physical engine, and obtaining the cutting data based on the target cutting model satisfying the cutting end condition.

10. The collision data processing method according to claim 9, wherein the acquiring the cutting end condition associated with the physical engine comprises:

acquiring the cutting end condition associated with the physical engine, the cutting end condition comprising a model size threshold;

acquiring a model size of the target cutting model, and based on the model size of the target cutting model being less than or equal to the model size threshold, determining that the target cutting model satisfies the cutting end condition, and taking the target cutting model as a target model;

determining a target rigid body corresponding to the target model based on the physical engine and target model information of the target model; and acquiring a physical attribute of the target rigid body, controlling the target model to execute a physical motion based on the physical attribute of the target rigid body, acquiring an animation image frame during the execution of the physical motion, and obtaining the cutting data based on the animation image frame.

11. The collision data processing method according to claim 9, further comprising:

based on the target cutting model not satisfying the cutting end condition, determining a second cutting surface in the target cutting model based on second central position information of a central point of the target cutting model, the normal vector information, and the first cutting surface; and cutting the target cutting model based on the second cutting surface until a cut model satisfies the cutting end condition.

12. The collision data processing method according to claim 1, further comprising:

based on a target cutting model not satisfying a cutting end condition, determining a second cutting surface in the target cutting model based on second central position information of a central point of the target cutting model, the normal vector information, and the first cutting surface; and cutting the target cutting model based on the second cutting surface until a cut model satisfies the cutting end condition.

13. A collision data processing apparatus comprising:

at least one memory configured to store program code; and at least one processor configured to read the program code and operate as instructed by the program code, the program code comprising:

initial cutting model determining code configured to cause at least one of the at least one processor to determine, based on a physical engine detecting that a first rigid body having a first physical attribute collides with a second rigid body having a second physical attribute, an initial cutting model from a first model corresponding to the first rigid body and a second model corresponding to the second rigid body based on the first physical attribute and the second physical attribute;

normal vector information determining code configured to cause at least one of the at least one processor to capture, by the physical engine, a collision point between the first rigid body and the second rigid body, and determine normal vector information corresponding to the collision point based on collision data associated with the collision point; and first cutting code configured to cause at least one of the at least one processor to determine a first cutting surface in the initial cutting model based on the collision point, the normal vector information, and model information of the initial cutting model, and cut the initial cutting model based on the first cutting surface to obtain cutting data for presentation on a mobile terminal, the cutting data representing a collision effect between the first model and the second model.

14. The collision data processing apparatus according to claim 13, wherein the program code further comprises:

original model creating code configured to cause at least one of the at least one processor to start a model creation engine, and create N original models through the model creation engine, the N original models comprising the first model and the second model, and N being an integer greater than or equal to 2;

first binding code configured to cause at least one of the at least one processor to determine first model information of the first model based on the physical engine, determine first rigid body information of the first rigid body comprising the first model according to the first model information, create the first rigid body to be bound with the first model based on the first rigid body information, and bind the first rigid body with a first variable parameter in the first model, the first variable parameter instructing the physical engine to determine the first rigid body corresponding to the first model; and second binding code configured to cause at least one of the at least one processor to determine second model information of the second model based on the physical engine, determine second rigid body information of the second rigid body comprising the second model according to the second model information, create the second rigid body to be bound with the second model based on the second rigid body information, and bind the second rigid body with a second variable parameter in the second model, the second variable parameter instructing the physical engine to determine the second rigid body corresponding to the second model.

15. The collision data processing apparatus according to claim 14, wherein the program code further comprises:

physical attribute acquiring code configured to cause at least one of the at least one processor to acquire physical attributes of N rigid bodies corresponding to the N original models based on the physical engine; determine a reference collision rigid body from the N rigid bodies, and take rigid bodies other than the reference collision rigid body in the N rigid bodies as candidate collision rigid bodies;

collision region determining code configured to cause at least one of the at least one processor to determine a collision region associated with the reference collision rigid body based on a physical attribute of the reference collision rigid body and a collision distance threshold corresponding to the physical engine;

candidate contact pair determining code configured to cause at least one of the at least one processor to determine, in a presence of a candidate collision rigid body, falling into the collision region, among the candidate collision rigid bodies, the candidate collision rigid body falling into the collision region as a target collision rigid body, and form candidate contact pairs by the target collision rigid body and the reference collision rigid body; and collision group determining code configured to cause at least one of the at least one processor to acquire a collision detection condition, perform collision detection on the candidate contact pairs based on the collision detection condition, screen a candidate contact pair satisfying the collision detection condition from the respective candidate contact pairs, and take the screened candidate contact pair as a collision group, the reference collision rigid body in the collision group being the first rigid body, and the target collision rigid body in the collision group being the second rigid body.

16. The collision data processing apparatus according to claim 15, wherein the collision group determining code further configured to cause at least one of the at least one processor to:

perform collision detection on the target collision rigid body and the reference collision rigid body in the candidate contact pairs based on a physical attribute of the target collision rigid body in the candidate contact pairs and the physical attribute of the reference collision rigid body in the candidate contact pairs;

determine a first predicted contact point in the target collision rigid body, determine a second predicted contact point corresponding to the first predicted contact point in the reference collision rigid body, and determine a predicted distance between the first predicted contact point and the second predicted contact point through the physical engine;

acquire the collision detection condition, the collision detection condition screening the candidate contact pairs having non-positive predicted distances; and screen the candidate contact pair satisfying the collision detection condition as the collision group from the respective candidate contact pairs.

17. The collision data processing apparatus according to claim 13, wherein the normal vector information determining code is further configured to cause at least one of the at least one processor to:

capture, by the physical engine, the collision point at which the first rigid body collides with the second rigid body in a model coordinate system where the initial cutting model is located;

acquire, by the physical engine, a collision impulse generated based on the first rigid body colliding with the second rigid body, and an impulse direction of the collision impulse; determine a normal vector length of a normal vector associated with the collision point according to the collision impulse, and determine a normal vector direction of the normal vector according to the impulse direction; and determine the normal vector information corresponding to the collision point based on the normal vector direction and the normal vector length.

18. The collision data processing apparatus according to claim 13, wherein the program code further comprises:

cutting surface determining code configured to cause at least one of the at least one processor to determine, based on a target cutting model not satisfying a cutting end condition, a second cutting surface in the target cutting model based on second central position information of a central point of the target cutting model, the normal vector information, and the first cutting surface; and second cutting code configured to cause at least one of the at least one processor to cut the target cutting model based on the second cutting surface until a cut model satisfies the cutting end condition.

19. A non-transitory computer-readable storage medium, storing computer code that, when executed by at least one processor, causes the at least one processor to at least:

determine, based on a physical engine detecting that a first rigid body having a first physical attribute collides with a second rigid body having a second physical attribute, an initial cutting model from a first model corresponding to the first rigid body and a second model corresponding to the second rigid body based on the first physical attribute and the second physical attribute;

capture, by the physical engine, a collision point between the first rigid body and the second rigid body, and determine normal vector information corresponding to the collision point based on collision data associated with the collision point; and determine a first cutting surface in the initial cutting model based on the collision point, the normal vector information, and model information of the initial cutting model, and cut the initial cutting model based on the first cutting surface to obtain cutting data for presentation on a mobile terminal, the cutting data representing a collision effect between the first model and the second model.

20. The non-transitory computer-readable storage medium according to claim 19, wherein the computer code is further configured to, when executed by the at least one processor, cause the at least one processor to at least:

determine, based on a target cutting model not satisfying a cutting end condition, a second cutting surface in the target cutting model based on second central position information of a central point of the target cutting model, the normal vector information, and the first cutting surface; and cut the target cutting model based on the second cutting surface until a cut model satisfies the cutting end condition.

* * * * *